(12) United States Patent
Kurashina

(10) Patent No.: US 8,215,832 B2
(45) Date of Patent: Jul. 10, 2012

(54) INFRARED SENSOR AND MANUFACTURING METHOD THEREOF

(75) Inventor: Seiji Kurashina, Tokyo (JP)

(73) Assignee: NEC Corporation, Tokyo (JP)

( * ) Notice: Subject to any disclaimer, the term of this patent is extended or adjusted under 35 U.S.C. 154(b) by 630 days.

(21) Appl. No.: 12/369,871

(22) Filed: Feb. 12, 2009

(65) Prior Publication Data

US 2009/0207879 A1  Aug. 20, 2009

(30) Foreign Application Priority Data

Feb. 14, 2008  (JP) .................................. 2008-032885

(51) Int. Cl.
- *G01J 5/00* (2006.01)
- *G01J 5/20* (2006.01)
- *H01L 27/14* (2006.01)

(52) U.S. Cl. ........................ 374/133; 438/54; 250/338.1

(58) Field of Classification Search .................. 374/133; 250/338.1, 338.4, 352; 257/467, 469, 470, 257/E27.008; 438/54, 55

See application file for complete search history.

(56) References Cited

U.S. PATENT DOCUMENTS

| | | | |
|---|---|---|---|
| 6,255,712 B1 * | 7/2001 | Clevenger et al. | 257/522 |
| 6,448,557 B2 * | 9/2002 | Oda | 250/338.3 |
| 6,800,854 B2 * | 10/2004 | Pfister et al. | 250/338.1 |
| 7,384,821 B2 * | 6/2008 | Sung | 438/122 |
| 7,417,229 B2 * | 8/2008 | Sasaki et al. | 250/338.1 |
| 2002/0040967 A1 * | 4/2002 | Oda | 250/338.1 |
| 2003/0141453 A1 * | 7/2003 | Reed et al. | 250/338.1 |
| 2009/0134333 A1 * | 5/2009 | Ishibashi et al. | 250/352 |
| 2010/0301489 A1 * | 12/2010 | Seidel et al. | 257/773 |

FOREIGN PATENT DOCUMENTS

| | | | |
|---|---|---|---|
| JP | 6-151661 A | | 5/1994 |
| JP | 09318453 A | * | 12/1997 |
| JP | 1998227689 A | | 8/1998 |

OTHER PUBLICATIONS

Korean Office Action for KR10-2009-0011886 issued Aug. 30, 2010.

* cited by examiner

*Primary Examiner* — R. A. Smith

(57) ABSTRACT

A first thermosensitive element including a temperature detecting unit that outputs a voltage corresponding to a temperature to which the unit rises from ambient temperature (temperature of surrounding environment) due to incident infrared, and a second thermosensitive element including a temperature detecting unit that outputs a voltage based on ambient temperature are formed above/on a silicon substrate. The temperature detecting unit of the first thermosensitive element is thermally insulated from the silicon substrate by a clearance (space). The temperature detecting unit of the second thermosensitive element is formed on a first sacrifice layer made of deposited diamond like carbon, and thermally connected to the silicon substrate by the first sacrifice layer. The infrared sensor detects an amount of incident infrared based on the difference between output voltages of the first and second thermosensitive elements.

6 Claims, 22 Drawing Sheets

FIG.12A
FIG.12B
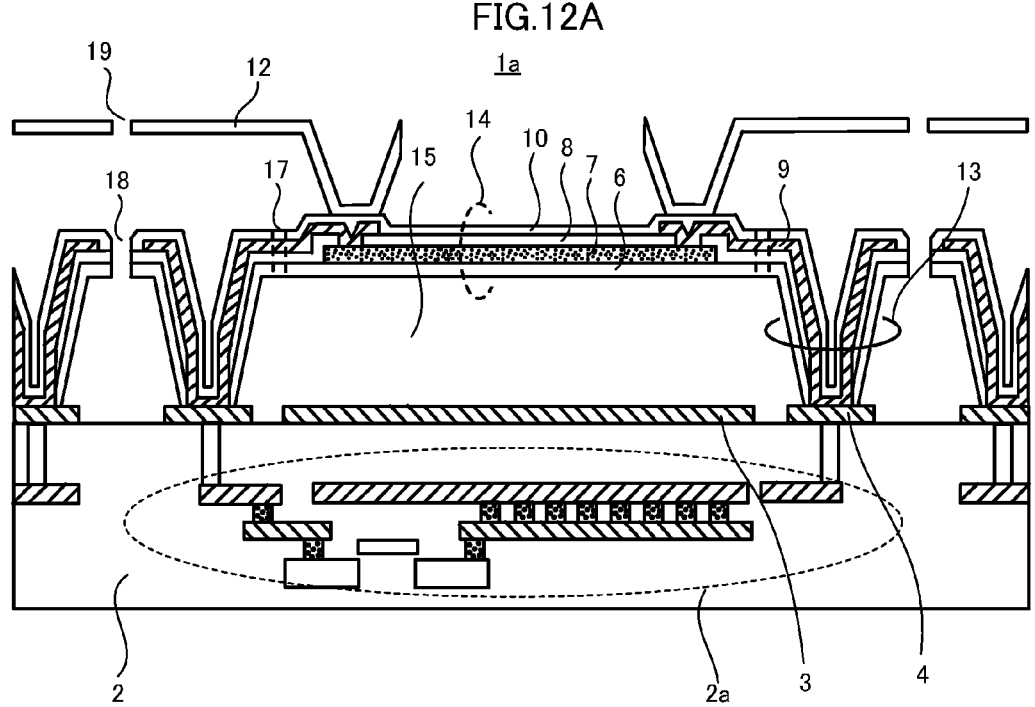
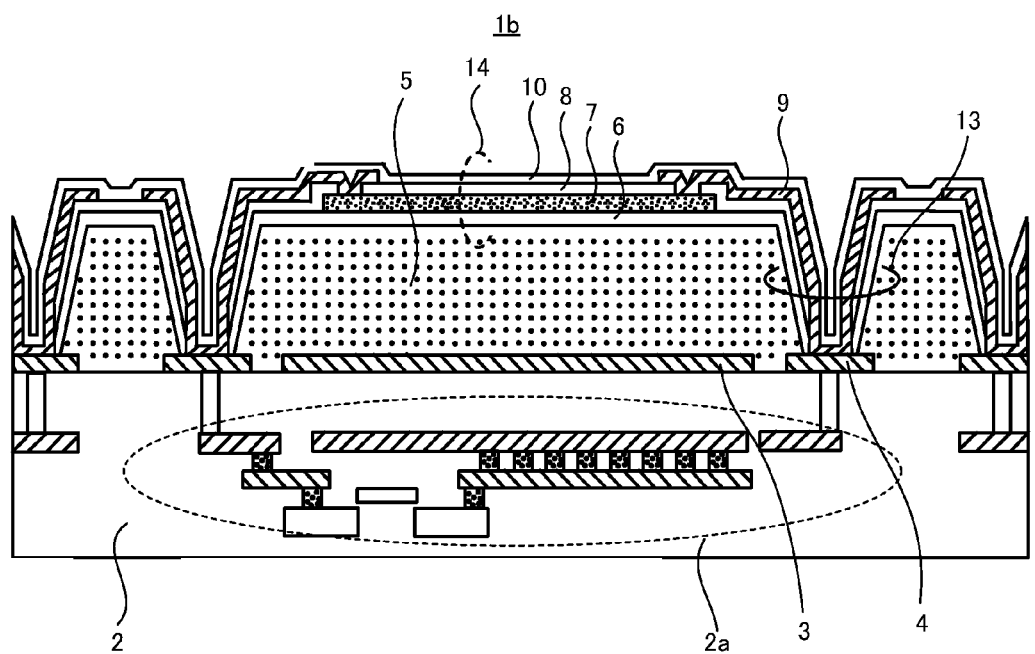

1a

1b

1a

19

1b

INFRARED SENSOR AND MANUFACTURING METHOD THEREOF

BACKGROUND OF THE INVENTION

This application is based on Japanese Patent Application No. 2008-032885 filed on Feb. 14, 2008 and including specification, claims, drawings and summary. The disclosure of the above Japanese Patent Application is incorporated herein by reference in its entirety.

BACKGROUND OF THE INVENTION

1. Field of the Invention

The present invention relates to an infrared sensor and a manufacturing method thereof, and particularly to an infrared sensor that detects an infrared ray by using a thermosensitive resistor whose resistance value changes when an infrared ray enters it, and a manufacturing method thereof.

2. Description of the Related Art

In general, thermal type infrared sensors use a thermosensitive resistor such as a bolometer thin film, and make it absorb infrared rays radiated from an object and transform the infrared into heat to cause the temperature of the thermosensitive resistor to rise and its resistance value to change, thereby detecting the amount of the received infrared rays based on the change of the resistance value.

Infrared sensor arrays are also known, which are built up of infrared sensors integrated two-dimensionally in the form of a matrix, on whose pixels are arranged the respective infrared sensors. Infrared sensor arrays can enable photography during nighttime by letting the infrared sensors on the respective pixels detect the amount of infrared that enters the respective pixels.

However, since thermal type infrared sensors detect the amount of infrared based on a change of the temperature of the thermosensitive resistor, they may not be able to correctly detect the amount of infrared if there occurs a change of the ambient temperature (the temperature of the environment surrounding the infrared sensors) that might cause a drift that influences the output of the infrared sensors.

It is possible to overcome this problem by, for example, equipping the infrared sensor array with a temperature regulator. With temperature regulation on each infrared sensor by the temperature regulator, any drift of the output from the infrared sensors due to a change of the ambient temperature can be suppressed. However, this method requires furnishing of a temperature regulator and entails a product price increase. Hence, Unexamined Japanese Patent Publication KOKAI Publication No. H10-227689 describes an infrared sensor that suppresses any drift of its output without using a temperature regulator.

This infrared sensor includes a first thermosensitive element whose resistance value changes in response to an entering infrared ray, and a second thermosensitive element whose resistance barely changes in response to an entering infrared ray. The first thermosensitive element detects the amount of the entering infrared ray. The voltage output from the first thermosensitive element is corrected by the voltage output from the second thermosensitive element in a manner to cancel any influence from a change of the ambient temperature.

The first thermosensitive element has a heat-insulated structure that prohibits heat transfer from a bolometer thin film to a silicon substrate. Accordingly, the temperature of the first thermosensitive element rises above the ambient temperature when an infrared ray enters there. As a result, the first thermosensitive element comes to have a resistance value that is determined by the ambient temperature and the amount of the entering infrared ray.

On the other hand, the second thermosensitive element has a structure that allows heat transfer from the bolometer thin film to the silicon substrate. Since the heat produced in the bolometer thin film in response to an entering infrared ray escapes into the silicon substrate, the temperature of the second thermosensitive element does not almost change when an infrared ray enters. As a result, the second thermosensitive element comes to have a resistance value that is determined by the ambient temperature.

This infrared sensor lets electric currents of the same level flow through the first and second thermosensitive elements, and reads the difference between the resulting voltages in them. The infrared sensor detects the amount of the entering infrared ray by offsetting the influence of the ambient temperature change based on the voltage difference.

The first thermosensitive element is formed of a bolometer thin film that is disposed on a hollow support base to provide a clearance between the bolometer thin film and the silicon substrate. This clearance hinders the bolometer thin film from transferring its heat to the silicon substrate, thermally insulating the bolometer thin film from the silicon substrate. For this reason, the temperature of the first thermosensitive element changes in response to an entering infrared ray, and the resistance value of the bolometer thin film of the first thermosensitive element changes based on both of the incidence of the infrared ray and a change of the ambient temperature.

Meanwhile, the second thermosensitive element is formed of a bolometer thin film formed on a support base as well as the first thermosensitive element, but the support base is not hollow to allow thermal communication between the bolometer thin film and the silicon substrate. Therefore, the bolometer thin film easily transfers its heat to the silicon substrate. The bolometer thin film of the first thermosensitive element and that of the second thermosensitive element have the same shape and almost equal Temperature Coefficient of Resistance (TCR) values.

When an infrared ray enters the bolometer thin film of the second thermosensitive element, the heat produced by the infrared ray transfers to the heat sink silicon substrate, leaving the resistance value of the bolometer thin film of the second thermosensitive element almost unchanged. That is, the resistance value of the bolometer thin film of the second thermosensitive element changes based only on a change of the ambient temperature.

The support base for the bolometer thin film of the second thermosensitive element may be formed thin or may be formed to a height of almost the same level with the top of the clearance of the first thermosensitive element.

However, if the support base for the bolometer thin film of the second thermosensitive element is formed thinly, the members that constitute the first thermosensitive element and the members that constitute the second thermosensitive element may come at different heights, and this might cause a reduced projection exposure machine, which is used for forming a resist mask on the members, to miss the focus and allow a poor accuracy in the resist mask pattern. Hence, when manufacturing an infrared sensor that includes first and second thermosensitive elements, it is advantageous in terms of processing convenience that the support base of the bolometer thin film of the second thermosensitive element be formed to have a height almost the same as that of the clearance of the first thermosensitive element.

In the case of forming the support base of the bolometer thin film of the second thermosensitive element to have a height almost the same as that of the clearance of the first thermosensitive element, a sacrifice layer is formed on the silicon substrate, and the bolometer thin film of the first and second thermosensitive elements, and a protection member are formed on the sacrifice layer. Then, a slit is formed in the first thermosensitive element to expose the sacrifice layer such that only the sacrifice layer that underlies the first thermosensitive element is etched out and a clearance is formed. The bolometer thin film of the second thermosensitive element is thermally connected to the silicon substrate via the sacrifice layer.

The sacrifice layer needs to be of a material that can be easily removed with no unfavorable influence on the other structural members. Hence, the sacrifice layer is formed of the resin such as polyimide, which can be removed by dry etching is used. However, the resin such as polyimide have a small heat transfer rate, and cannot therefore quickly let out to the silicon substrate the heat produced in the bolometer thin film by an entering infrared ray. The resin such as polyimide have a problem that they cannot make the temperature of the second thermosensitive element quickly follow the temperature of the silicon substrate.

To improve the heat transfer, the sacrifice layer may be made of silicon, polysilicon, metal, etc. However, these materials generally need to be removed by wet etching. Wet etching entails difficulty in draining the etching solution that gets stocked in the clearance. Further, wet etching has a problem that the clearance might be deformed to bring the bolometer thin film of the first thermosensitive element in contact with the silicon substrate, while the etching solution is drained.

SUMMARY OF THE INVENTION

The present invention was made in view of the above problems, and an object of the present invention is to provide an infrared sensor and a manufacturing method thereof that realize a structure that includes: a first thermosensitive element whose thermosensitive resistor is thermally insulated from a silicon substrate by a clearance; and a second thermosensitive element whose thermosensitive resistor is disposed on a sacrifice layer, where the structure can make the thermosensitive resistor of the second thermosensitive element quickly follow the temperature of the substrate and can prevent occurrence of any problem in removing the sacrifice layer from the first thermosensitive element.

To achieve the above object, an infrared sensor according to the present invention includes:

a first element including a temperature detecting unit that outputs a signal corresponding to a temperature to which the temperature detecting unit has risen from an ambient temperature in response to an infrared ray that has entered the temperature detecting unit, the first element being formed above a substrate;

a second element including a temperature detecting unit that outputs a signal corresponding to the ambient temperature, the second element being formed on the substrate; and a signal correcting unit that corrects the signal output by the temperature detecting unit of the first element based on the signal output by the temperature detecting unit of the second element, wherein the temperature detecting unit of the first element and the substrate are disposed to have a clearance therebetween, and a sacrifice layer that is made of diamond like carbon is formed between the temperature detecting unit of the second element and the substrate.

A manufacturing method of an infrared sensor according to the present invention is a method of manufacturing an infrared sensor including: a first element that outputs a signal corresponding to a temperature to which the first element has risen from an ambient temperature in response to an infrared ray that has entered the first element; and a second element that outputs a signal corresponding to the ambient temperature, the method including:

a step of forming a sacrifice layer made of diamond like carbon on a region of a substrate above which the first element is intended to be formed and on a region of the substrate on which the second element is intended to be formed;

a step of forming a first protection film that covers the sacrifice layer;

a step of forming, on the first protection film that covers the sacrifice layer, a thin-film-like thermosensitive resistor whose resistance value changes in response to a temperature change corresponding to heat produced by an infrared ray that enters the thermosensitive resistor;

a step of forming a third protection film that covers the thermosensitive resistor; and a step of forming a slit that penetrates through the first protection film and the third protection film that are formed on the region above which the first element is intended to be formed, and removing through the slit, the sacrifice layer formed on the region above which the first element is intended to be formed.

BRIEF DESCRIPTION OF THE DRAWINGS

These objects and other objects and advantages of the present invention will become more apparent upon reading of the following detailed description and the accompanying drawings in which:

FIG. 12A is a cross sectional view showing an example structure of the first thermosensitive element according to a modified example of the first example of the present invention;

FIG. 12B is a cross sectional view showing an example structure of the second thermosensitive element according to the modified example of the first example of the present invention;

DETAILED DESCRIPTION OF THE PREFERRED EMBODIMENT

An infrared sensor according to one exemplary embodiment of the present invention has its first thermosensitive element for detecting an infrared ray, and it corrects the output of the first thermosensitive element based on an output of its second thermosensitive element in a manner to cancel any influence of a change of the ambient temperature (the temperature of the environment surrounding the infrared sensor). The present infrared sensor corrects outputs of a plurality of first thermosensitive elements based on an output of one second thermosensitive element. An infrared sensor array formed of such infrared sensors has a plurality of first thermosensitive elements, which are arranged in a matrix form in the center of the infrared sensor array. The second thermosensitive element is arranged outside the matrix of the first thermosensitive elements.

Figure 1:
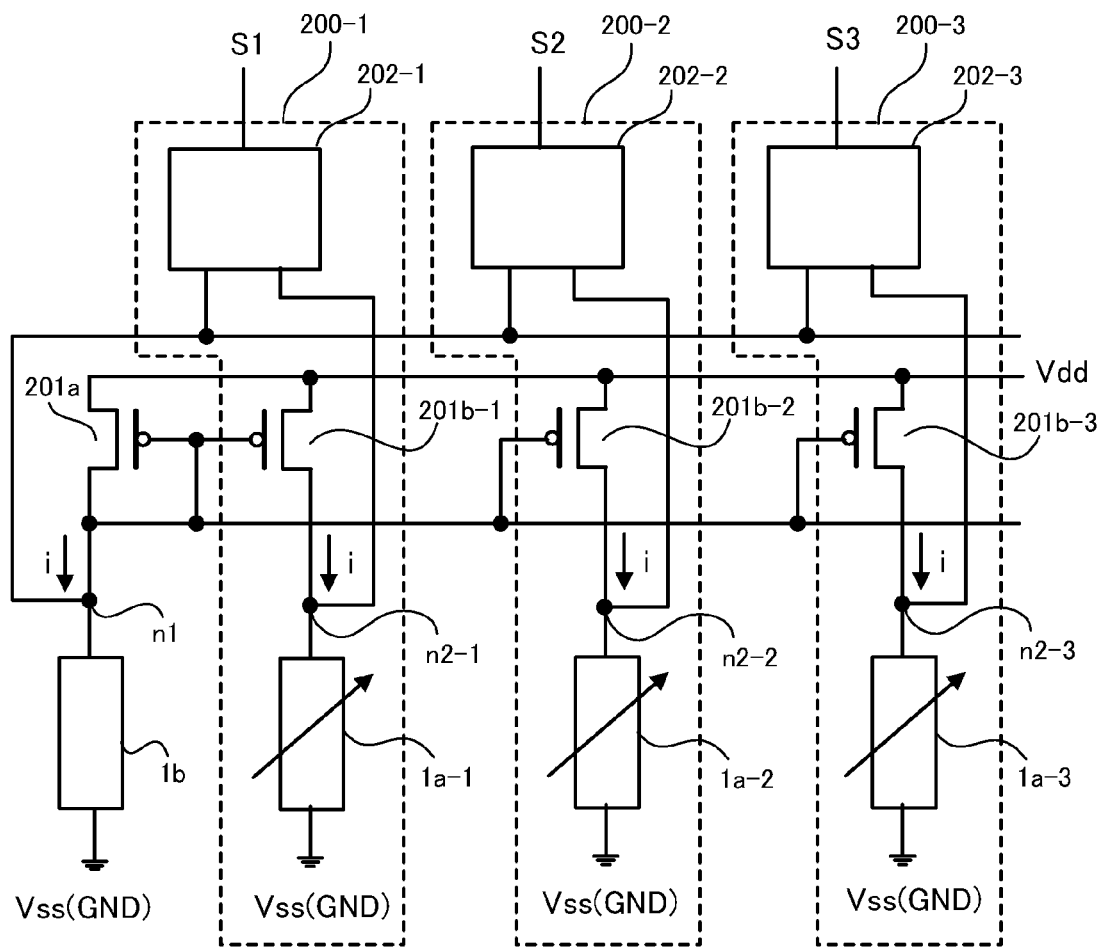
FIG. 1 is a diagram showing an example structure of an infrared sensor included in an infrared sensor array according to one exemplary embodiment of the present invention.

FIG. 1 shows the structure of three infrared sensors 200-1, 200-2, and 200-3 included in an infrared sensor array according to one exemplary embodiment of the present invention.

The infrared sensor 200-1 includes a first thermosensitive element 1a-1, a Positive channel Metal Oxide Semiconductor (PMOS) transistor 201b-1, and a voltage difference detecting circuit 202-1. The infrared sensor 200-2 includes a first thermosensitive element 1a-2, a PMOS transistor 201b-2, and a voltage difference detecting circuit 202-2. The infrared sensor 200-3 includes a first thermosensitive element 1a-3, a PMOS transistor 201b-3, and a voltage difference detecting circuit 202-3.

The infrared sensor 200-1, the infrared sensor 200-2, and the infrared sensor 200-3 correct the voltages output from the first thermosensitive element 1a-1, the first thermosensitive element 1a-2, and the first thermosensitive element 1a-3 respectively, based on a voltage output from a second thermosensitive element 1b.

A PMOS transistor 201a has its gate and drain connected. The gate of the PMOS transistor 201a, the gate of the PMOS transistor 201b-1, the gate of the PMOS transistor 201b-2, and the gate of the PMOS transistor 201b-3 are connected. The source of the PMOS transistor 201a, the source of the PMOS transistor 201b-1, the source of the PMOS transistor 201b-2, and the source of the PMOS transistor 201b-3 are connected, and to which a power source voltage Vdd is applied. The PMOS transistor 201a constitutes a current mirror circuit with the PMOS transistor 201b-1, the PMOS transistor 201b-2, and the PMOS transistor 201b-3.

One terminal of the second thermosensitive element 1b is connected to the drain (node n1) of the PMOS transistor 201a that constitutes the current mirror circuit. A reference potential Vss (GND) is applied to the other terminal of the second thermosensitive element 1b.

One terminal of the first thermosensitive element 1a-1 is connected to the drain (node n2-1) of the PMOS transistor 201b-1 that constitutes the current mirror circuit, and the reference potential Vss (GND) is applied to the other terminal of the first thermosensitive element 1a-1. One input terminal of the voltage difference detecting circuit 202-1 is connected to the node n1, and the other input terminal thereof is connected to the node n2-1.

Likewise, one terminal of the first thermosensitive element 1a-2 is connected to the drain (node n2-2) of the PMOS transistor 201b-2 that constitutes the current mirror circuit, and the reference potential Vss (GND) is applied to the other terminal of the first thermosensitive element 1a-2. One input terminal of the voltage difference detecting circuit 202-2 is connected to the node n1, and the other input terminal thereof is connected to the node n2-2.

One terminal of the first thermosensitive element 1a-3 is connected to the drain (node n2-3) of the PMOS transistor 201b-3 that constitutes the current mirror circuit, and the reference potential Vss (GND) is applied to the other terminal of the first thermosensitive element 1a-3. One input terminal of the voltage difference detecting circuit 202-3 is connected to the node n1, and the other input terminal thereof is connected to the node n2-3.

The first thermosensitive element 1a-1, the first thermosensitive element 1a-2, the first thermosensitive element 1a-3, and the second thermosensitive element 1b include a bolometer thin film, which is a thermosensitive resistor formed into a thin film.

The first thermosensitive element 1a-1, the first thermosensitive element 1a-2, and the first thermosensitive element 1a-3 have a clearance (space) between their bolometer thin film and a silicon substrate. The first thermosensitive element 1a-1, the first thermosensitive element 1a-2, and the first thermosensitive element 1a-3 are prohibited by this clearance from transferring heat from the bolometer thin film to the silicon substrate to have heat insulation between the bolometer thin film and the silicon substrate. Therefore, the resistance value of the first thermosensitive element 1a-1, the first thermosensitive element 1a-2, and the first thermosensitive element 1a-3 changes based on both an incidence of an infrared ray and a change of the ambient temperature.

The bolometer thin film of the second thermosensitive element 1b is disposed on a sacrifice layer. The second thermosensitive element 1b easily transfers heat from the bolometer thin film to the silicon substrate via the sacrifice layer to have a thermal communication between the bolometer thin film and the silicon substrate. Heat produced by an infrared ray that enters the second thermosensitive element 1b escapes into the silicon substrate. Therefore, the resistance value of the second thermosensitive element 1b changes based only on a change of the ambient temperature.

As said above, the PMOS transistor 201a constitutes a current mirror circuit with the PMOS transistor 201b-1, the PMOS transistor 201b-2, and the PMOS transistor 201b-3. Therefore, an electric current i that is of the same level as an electric current i that flows through the second thermosensitive element 1b flows through each of the first thermosensitive element 1a-1, the first thermosensitive element 1a-2, and the first thermosensitive element 1a-3.

A voltage that is determined only by the ambient temperature occurs at the node n1, while a voltage that is determined by the amount of an infrared ray entering the first thermosensitive element 1a-1, the first thermosensitive element 1a-2, and the first thermosensitive element 1a-3 and the ambient temperature occurs at each of the node n2-1, the node n2-2, and the node n2-3.

The voltage difference detecting circuit 202-1 obtains the difference between the voltage at the node n2-1 and the voltage at the node n1, and outputs the voltage difference from its output terminal S1. This voltage difference represents the amount of infrared that has entered the first thermosensitive element 1a-1. Likewise, the voltage difference detecting circuit 202-2 outputs the difference between the voltage at the node n2-2 and the voltage at the node n1 from its output terminal S2. This voltage difference represents the amount of infrared that has entered the first thermosensitive element 1a-2. The voltage difference detecting circuit 202-3 outputs the difference between the voltage at the node n2-3 and the voltage at the node n1 from its output terminal S3. This voltage difference represents the amount of infrared that has entered the first thermosensitive element 1a-3.

FIG. 1 shows an example of correcting the outputs from three first thermosensitive elements based on the output of one second thermosensitive element 1b. However, the number of first thermosensitive elements to be corrected by the output of one second thermosensitive element 1b may be one, two, or four or more. In the following description, the symbol "1a" indicates that the element denoted by this symbol is a first thermosensitive element.

The structure shown in FIG. 1 is one example of that of an infrared sensor. The structure may be another, if a voltage or a current output from the second thermosensitive element 1b corrects voltages or currents output from the first thermosensitive elements 1a.

As described above, the first thermosensitive elements 1a have a clearance between their bolometer thin film and the silicon substrate to have heat insulation between the bolometer thin film and the silicon substrate. The second thermosensitive element 1b has its bolometer thin film disposed on the sacrifice layer so that the height of the bolometer thin film is about the same as that of the first thermosensitive elements 1a.

If the sacrifice layer is made with the resin such as polyimide, the temperature of the bolometer thin film of the second thermosensitive element 1b cannot quickly follow the temperature of the silicon substrate. Further, if the sacrifice layer is made with silicon, polysilicon, metal or the like, there occurs a problem that the clearance between the bolometer thin film and the silicon substrate of the first thermosensitive elements 1a might be deformed while the sacrifice layer is removed.

To solve these problems, the inventor compared various materials about their material coefficients such as heat transfer rate, how easy it is to deposit and dry-etch them, influences they might give to the other members, etc. As a result, the inventor found out that a material suitable as the material of the sacrifice layer is a carbon material called Diamond Like Carbon (DLC), which has a crystalline structure having an intermediate state between diamond and graphite, (i.e., an amorphous structure in which both of diamond bonds (SP3 bonds) and graphite bonds (SP2 bonds) exist).

DLC has a heat transfer rate of 0.1 to 0.2 W/cm·K, which is by far larger than that of polyimide of 1 to 2 mW/cm·K. DLC is easy to deposit by plasma Chemical Vapor Deposition (CVD) method, Physical Vapor Deposition (PVD) method, etc., and easy to be removed by heating or plasma treatment in an oxygen atmosphere.

Further, in a case where the sacrifice layer is made with the resin such as polyimide, the material needs to be baked by heating treatment. During being baked, the resin shrinks and the sides of openings formed in the sacrifice layer get greatly sloped to reduce the area of the top surface of the sacrifice layer, which is an obstacle against providing the infrared sensor with a higher sensitivity, packageability at a higher density, and miniaturizability. DLC does not cause such deformation. Hence, the sides of openings formed in the sacrifice layer can be almost upright to provide a large area to the top surface of the sacrifice layer. Consequently, the infrared sensor can sense at a higher sensitivity, be packaged at a higher density, and be miniaturized.

Still further, polyimide has a large heat expansion coefficient of 4.4E-5° C. Therefore, polyimide can easily expand and shrink while an infrared sensor is manufactured due to the processing temperature, and can easily expand and shrink while the infrared sensor is used due to the ambient temperature. If polyimide deforms, the bolometer thin film formed thereon is stressed and might be broken or the voltage to be output by the bolometer thin film might fluctuate. DLC has a heat expansion coefficient of 2.0E-6, which is by far smaller than that of polyimide. Hence, DLC seldom deforms due to temperature and causes such problems.

Furthermore, DLC has a Vickers hardness of 3000 to 5000, and is thus by far harder than polyimide, which gives a greater degree of arbitrariness to the manufacturing process of an infrared sensor. For example, the sacrifice layer may be polished after it is formed. Hence, the sacrifice layer of the first thermosensitive elements 1a and second thermosensitive element 1b may have openings, which are formed therein, filled with metal so that the sacrifice layer can be planarized by polishing.

FIRST EXAMPLE

Figure 2A:
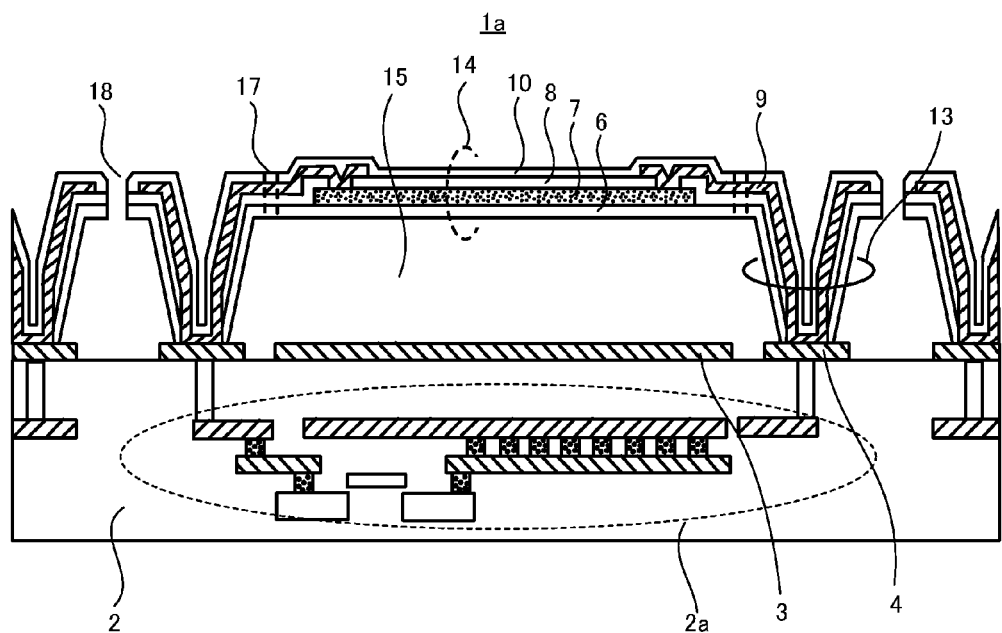
FIG. 2A is a cross sectional view showing an example structure of a first thermosensitive element according to a first example of the present invention.
Figure 2B:
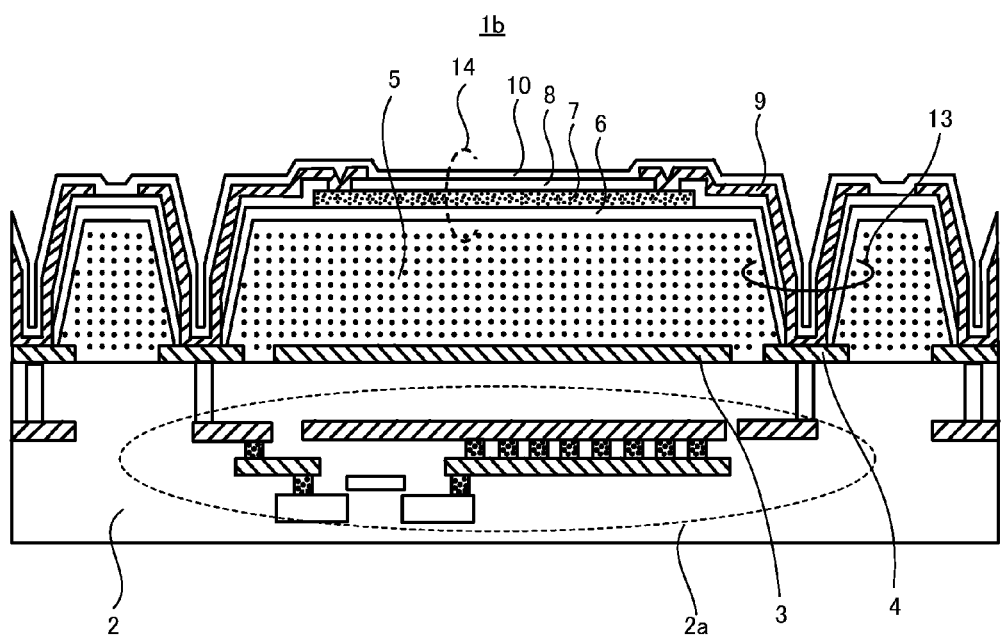
FIG. 2B is a cross sectional view showing an example structure of a second thermosensitive element according to the first example of the present invention.

A first thermosensitive elements 1a and a second thermosensitive element 1b of an infrared sensor and a manufacturing method thereof according to a first example of the present invention will now be explained in detail with reference to FIG. 2A through FIG. 20B. FIGS. 2A and 2B are diagrams exemplarily showing example structures of the first thermosensitive elements 1a and the second thermosensitive element 1b according to the first example. FIG. 2A is an example cross sectional view of the first thermosensitive elements 1a for detecting infrared. FIG. 2B is an example cross sectional view of the second thermosensitive element 1b for correcting voltages output by the first thermosensitive elements 1a. FIG. 3 through FIG. 11B are example cross sectional views that are observed in the manufacturing steps of the manufacturing method of the first thermosensitive elements 1a and the second thermosensitive element 1b according to the present example, where the first thermosensitive elements 1a and the second thermosensitive element 1b are separately shown if their structures are different. FIG. 12A through FIG. 20B are diagrams showing example structures and an example manufacturing method of the first thermosensitive elements 1a and the second thermosensitive element 1b according to a modified example of the present example.

The infrared sensor according to the present example includes the first thermosensitive elements 1a shown in FIG. 2A and the second thermosensitive element 1b shown in FIG. 2B. As shown in FIG. 2A, a first thermosensitive element 1a has a temperature detecting unit 14 (diaphragm) including a bolometer thin film 7, which is disposed above a silicon substrate 2 with a clearance (space) 15 therebetween. The temperature detecting unit 14 (diaphragm) has a sheet-like shape, and is held up by a supporting member 13 like a column. The first thermosensitive element 1a detects an infrared ray.

As shown in FIG. 2B, the second thermosensitive element 1b is formed of a temperature detecting unit 14 including a bolometer thin film 7, which is disposed on a first sacrifice layer 5. An output voltage of the second thermosensitive element 1b corrects output voltages of the first thermosensitive elements 1a. The second thermosensitive element 1b has a support member 13 of a same structure as that of the support member 13 of the first thermosensitive element 1a, and the support member 13 is embedded in the first sacrifice layer 5.

To explain the structure of the present infrared sensor specifically, a reading circuit 2a is built by a Complementary Metal Oxide Semiconductor (CMOS) process, in the interior of the silicon substrate 2, which is made of, for example, monocrystalline silicon. The reading circuit 2a includes the PMOS transistor 201a, the PMOS transistors 201b-1, 201b-2, and 201b-3, the voltage difference detecting circuits 202-1, 202-2, and 202-3, etc., which are shown in FIG. 1. It should be noted that the reading circuit 2a needs not necessarily be disposed right beneath the first thermosensitive elements 1a or the second thermosensitive element 1b, but some portions or the whole of the reading circuit 2a may be disposed outside the infrared sensing array. Furthermore, the reading circuit 2a may be formed inside a substrate other than the silicon substrate 2.

As described above, according to the present exemplary embodiment, the first thermosensitive elements 1a are disposed in a matrix form, and the second thermosensitive element 1b is disposed outside the matrix, thereby forming an infrared sensor array.

FIG. 2B shows an example where a plurality of second thermosensitive elements 1b are disposed side by side. However, for example, a total of four second thermosensitive elements 1b may be provided, each on one edge of the perimeter of the rectangular region where the first thermosensitive elements 1a are disposed in the matrix form. Further, only one second thermosensitive element 1b may be provided for the infrared sensor array.

An infrared reflecting film 3, which is topped with a protection film (unillustrated), is formed on the silicon substrate 2.

The clearance 15 of the first thermosensitive element 1a is, in earlier steps of the device manufacturing process, filled with DLC forming a first sacrifice layer 5, which is patterned thereinto. The first sacrifice layer 5 that fills the clearance 15 is removed by dry etching in a closing stage of the device manufacturing process. On the other hand, the second thermosensitive element 1b keeps patterned DLC (the first sacrifice layer 5).

The temperature detecting unit 14 is formed of a first protection film 6, a second protection film 8, a third protection film 10, a bolometer thin film 7 that is confined by these protection films, and an electrode wire 9. The temperature detecting unit 14 absorbs, for example, an infrared ray having a wavelength near 8 to 12 μm.

The support member 13 is a column having an opening thereinside, and formed of the first protection film 6, the second protection film 8, the third protection film 10, and the electrode wire 9, which is enclosed by these protection films. The support member 13 provides the clearance 15 and realizes a heat separation structure by suspending the temperature detecting unit 14 of the first thermosensitive element 1a above the silicon substrate 2. The clearances 15 of the plurality of first thermosensitive elements 1a that are disposed in the center of the infrared sensor array are continuous and form one clearance.

The electrode wire 9 electrically connects an end portion of the bolometer thin film 7 to a contact 4, which exists on the silicon substrate 2. The contact 4 is electrically connected to the reading circuit 2a. Voltages outout from the temperature detecting units 14 of the first thermosensitive elements 1a and the second thermosensitive elements 1b are transmitted through the electrode wire 9 to the reading circuit 2a. The reading circuit 2a outputs the difference between these output voltages, thereby an amount of infrared, which is a result of correcting any influence from a change of the ambient temperature, is detected.

A manufacturing method of the first thermosensitive element 1a and the second thermosensitive element 1b, which have the structures shown in FIG. 2A and FIG. 2B respectively, will be specifically explained with reference to FIG. 3 through FIG. 11B.

Figure 3:
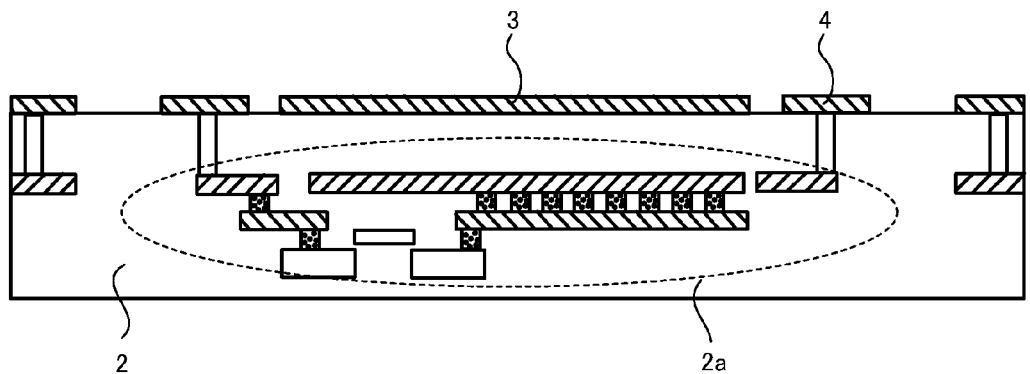
FIG. 3 is a cross sectional view observed in a step of an example manufacturing method of the first thermosensitive element and the second thermosensitive element according to the first example of the present invention.

First, as shown in FIG. 3, a metal layer of Al or the like is deposited by sputtering method or the like on the silicon substrate 2 to have a thickness of about 50 to 500 nm, and then a reflecting film 3 and the contact 4 are formed by patterning using a resist mask. The reflecting film 3 reflects an infrared ray that enters the temperature detecting unit 14. The contact 4 connects the electrode wire 9 and the reading circuit 2a. The said metal layer may be made by a material that has a high rate of infrared reflection and a small electric resistance. An infrared reflecting member made of a metal such as Ti, W, etc., a silicide film of such a metal, or the like may be used.

Figure 4:
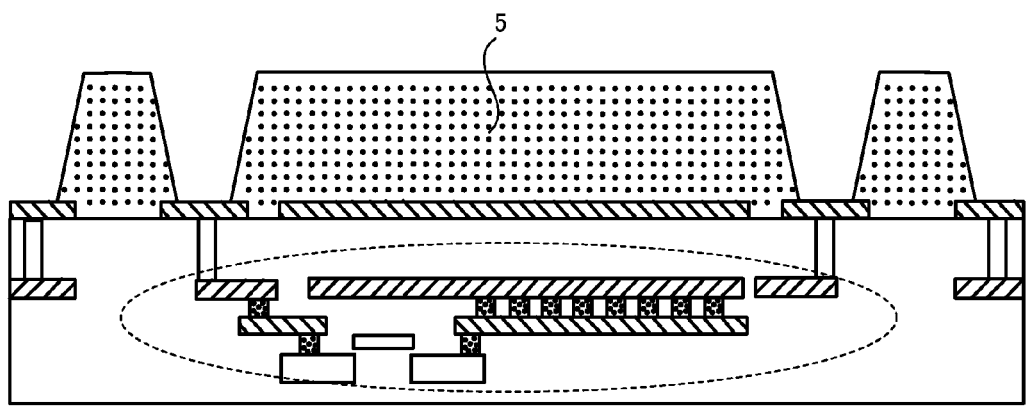
FIG. 4 is a cross sectional view observed in a step of an example manufacturing method of the first thermosensitive element and the second thermosensitive element according to the first example of the present invention.

Next, as shown in FIG. 4, DLC is deposited on the entire surface of the silicon substrate 2 by plasma CVD method, PVD method, or the like, and then patterned with a resist mask on to form the first sacrifice layer 5 on the regions other than the openings above the contacts 4. There is no DLC in the openings above the contacts 4. For example, according to ion plating method, which is one kind of the PVD method, a hydrocarbon gas such as benzene is introduced into a vacuum chamber, hydrocarbon ions are generated from plasma produced by direct current arcing, and the hydrocarbon ions collides with the sample and gets solidified, thereby the first sacrifice layer 5 is deposited.

Here, if photosensitive polyimide resin or the like is used as a material of the first sacrifice layer 5 and baked at a temperature of about 400° C. in order that the solvent may be removed, the polyimide shrinks and deforms to get the side wall of the openings mildly tapered. As a result, the top surface of the first sacrifice layer 5 becomes narrower, making it impossible to provide a large area for the temperature detecting unit 14 to occupy, which is an obstacle against providing the infrared sensor with a higher sensitivity, packageability at a higher density, and miniaturizability.

DLC does not cause such deformation and can hence stand the side wall of the openings formed in the DLC (the first sacrifice layer 5) almost upright, providing a large area for the temperature detecting unit 14 to occupy, which contributes to providing the infrared sensor with a higher sensitivity, packageability at a higher density, and miniaturizability.

Figure 5:
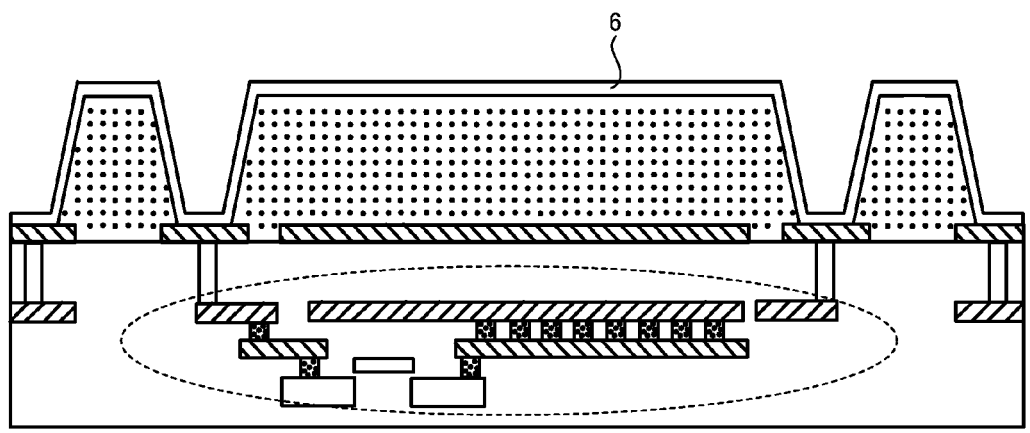
FIG. 5 is a cross sectional view observed in a step of an example manufacturing method of the first thermosensitive element and the second thermosensitive element according to the first example of the present invention.

Next, a silicon oxide film (SiO, $SiO_2$), a silicon nitride film (SiN, $Si_3N_4$), a silicon oxynitride film (SiON), or the like is deposited by plasma CVD method or the like on the first sacrifice layer 5 such that the film has a thickness of about 50 to 500 nm, thereby the first protection film 6 is formed as shown in FIG. 5.

Figure 6:
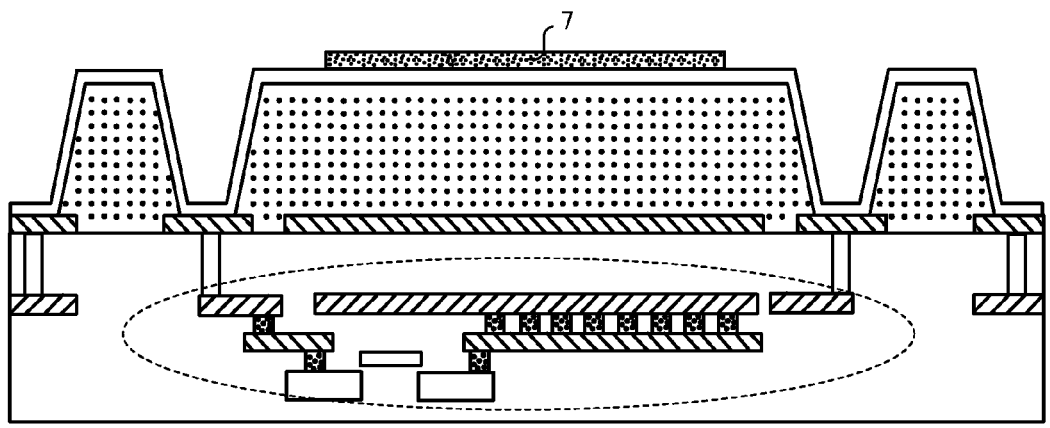
FIG. 6 is a cross sectional view observed in a step of an example manufacturing method of the first thermosensitive element and the second thermosensitive element according to the first example of the present invention.

Next, vanadium oxide ($V_2O_3$, VOx, or the like), titanium oxide (TiOx), or the like is deposited on the first protection film 6 by reactive sputtering or the like in an oxygen atmosphere such that the deposited product has a film thickness of about 10 to 200 nm, and then the film is patterned with a resist mask thereon, thereby the bolometer thin film 7 is formed at where the temperature detecting unit 14 is meant to be formed, as shown in FIG. 6. Here, vanadium oxide or titanium oxide is used as a material of the bolometer thin film 7, but any other material that has a large Temperature Coefficient of Resistance (TCR) may be used. For example, NiMnCo oxide, polycrystalline silicon, noncrystalline silicon, noncrystalline germanium, noncrystalline silicon germanium, (La, Sr)MnO$_3$, YBaCuO, or the like may be used.

Figure 7:
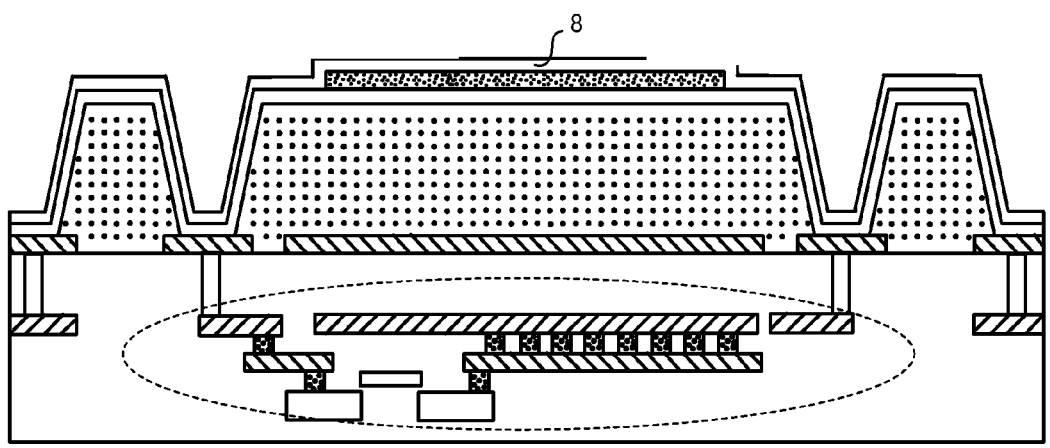
FIG. 7 is a cross sectional view observed in a step of an example manufacturing method of the first thermosensitive element and the second thermosensitive element according to the first example of the present invention.
Figure 8:
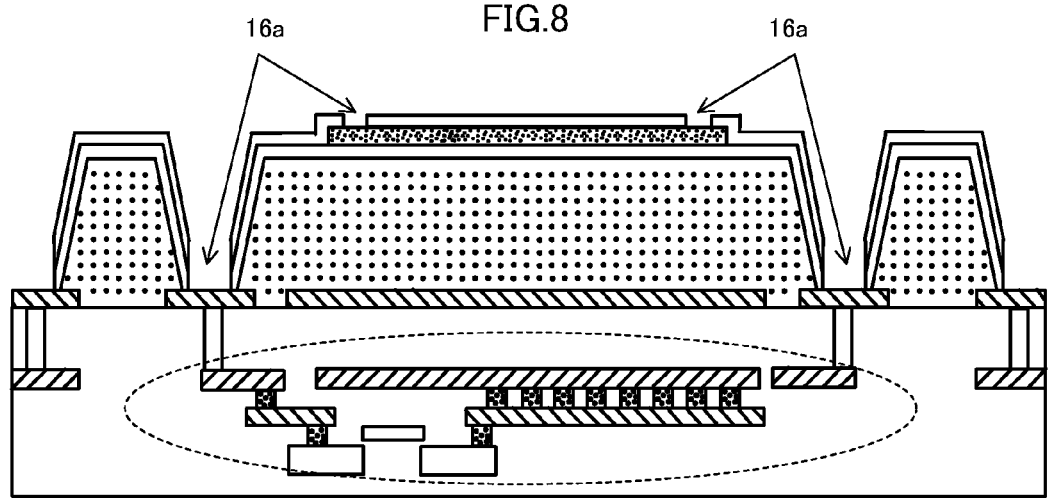
FIG. 8 is a cross sectional view observed in a step of an example manufacturing method of the first thermosensitive element and the second thermosensitive element according to the first example of the present invention.

Next, a silicon oxide film (SiO, SiO$_2$), silicon nitride film (SiN, Si$_3$N$_4$), a silicon oxynitride film (SiON), or the like is deposited by plasma CVD method or the like such that the film has a thickness of about 10 to 200 nm, thereby the second protection film 8 for protecting the bolometer thin film 7 is formed as shown in FIG. 7. After this, the first protection film 6 and second protection film 8 that exist on the contacts 4 and the second protection film 8 that exists on the end portions of the bolometer thin film 7 are removed, thereby contact holes 16a are formed as shown in FIG. 8.

Figure 9:
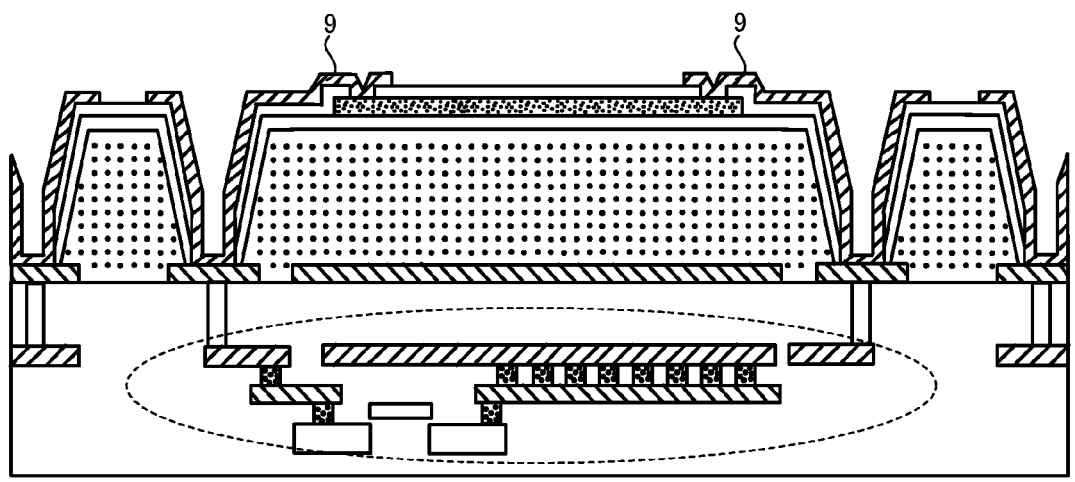
FIG. 9 is a cross sectional view observed in a step of an example manufacturing method of the first thermosensitive element and the second thermosensitive element according to the first example of the present invention.

Next, a metal such as Al, Cu, Au, Ti, W, Mo, etc. is deposited by sputtering method or the like such that the deposited metal has a film thickness of about 10 to 200 nm, and then the film is patterned with a resist mask thereon, thereby the electrode wire 9 is formed as shown in FIG. 9. The electrode wire 9 electrically connects the bolometer thin film 7 and the reading circuit 2a in the silicon substrate 2 via the contact holes 16a, and also constitutes a part of the support member 13 that supports the bolometer thin film 7 to provide the clearance 15 between the bolometer thin film 7 and the silicon substrate 2.

Figure 10:
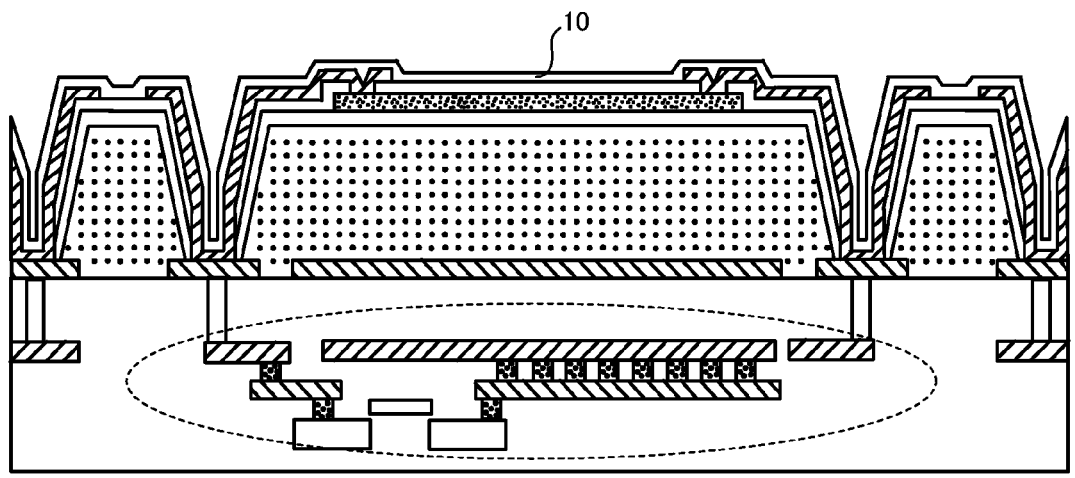
FIG. 10 is a cross sectional view observed in a step of an example manufacturing method of the first thermosensitive element and the second thermosensitive element according to the first example of the present invention.

Next, a silicon oxide film (SiO, SiO$_2$), a silicon nitride film (SiN, Si$_3$N$_4$), a silicon oxynitride film (SiON), or the like is deposited by plasma CVD method or the like such that the film has a thickness of about 50 to 500 nm, thereby the third protection film 10 for protecting the electrode wire 9 is formed as shown in FIG. 10.

Figure 11A:
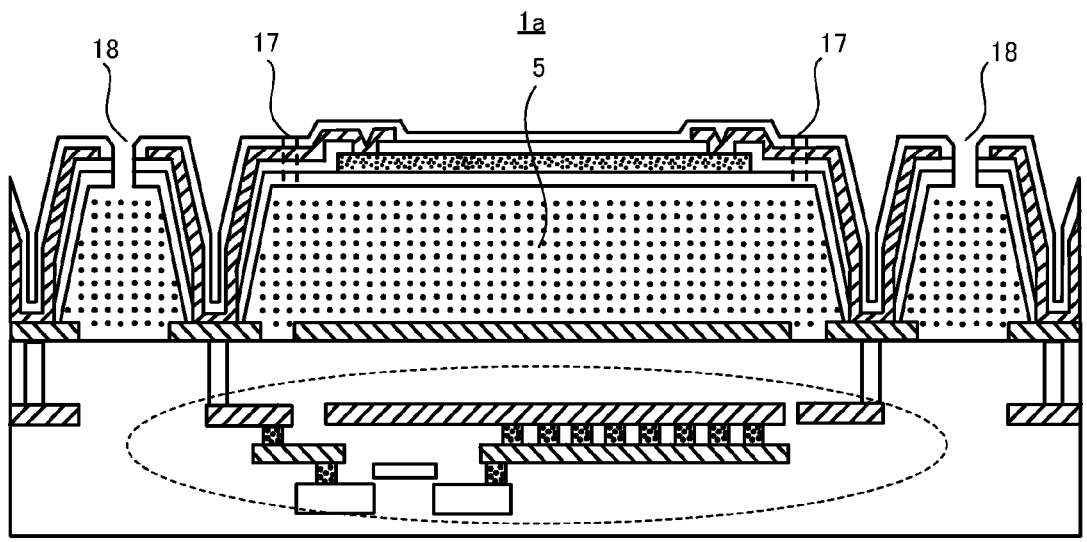
FIG. 11A is a cross sectional view observed in a step of an example manufacturing method of the first thermosensitive element according to the first example of the present invention.

Next, plasma etching method or the like is performed with the use of CF$_4$, C$_2$F$_6$, CHF$_3$, or the like to partially etch the first protection film 6, the second protection film 8, and the third protection film 10 such that first slits 17 are formed in a first thermosensitive element 1a and a second slit 18 is formed in the region between adjoining thermosensitive elements 1a, thereby the first sacrifice layer 5 is partially exposed as shown in FIG. 11A. The first slits 17 and the second slits 18 may be connected at unillustrated portions thereof to form one slit.

Figure 11B:
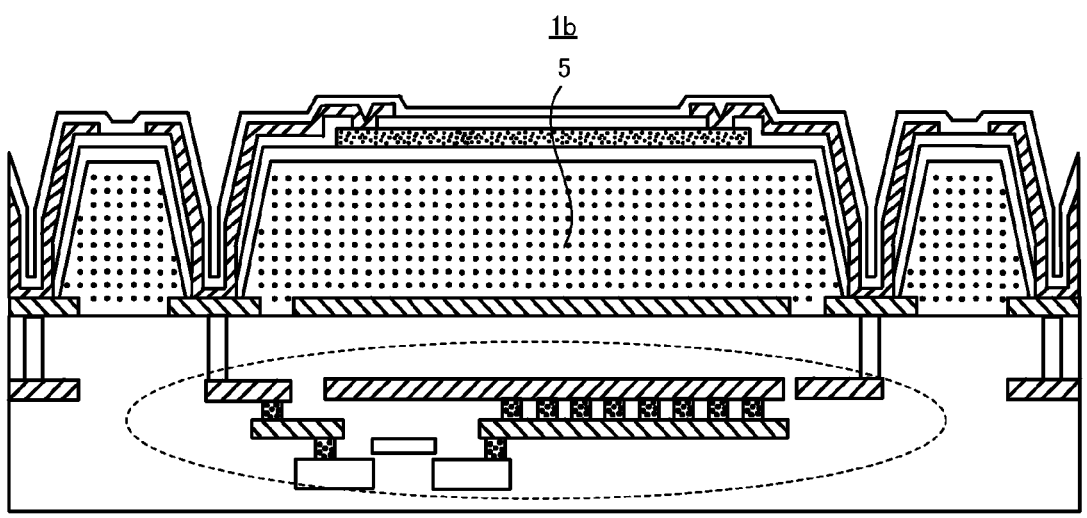
FIG. 11B is a cross sectional view observed in a step of an example manufacturing method of the second thermosensitive element according to the first example of the present invention.

The second thermosensitive element 1b requires the first sacrifice layer 5 not to be removed and has to keep it therebeneath. Therefore, no first slit 17 or second slit 18 is formed therein, as shown in FIG. 11B.

Then, heating or plasma treatment is applied in an oxygen atmosphere such that the first sacrifice layer 5 of the first thermosensitive elements 1a is removed from the first slits 17 and the second slits 18. At this time, since no first slit 17 or second slit 18 is formed in the second thermosensitive elements 1b, the first sacrifice layer 5 that exists beneath the temperature detecting unit 14 and in the region between adjoining thermosensitive elements 1b remains. In a case where silicon, polysilicon, metal, or the like is used as a material of the first sacrifice layer 5, wet etching is required to remove the material, which might put the temperature detecting unit 14 of the first thermosensitive element 1a at a risk of falling in contact with the silicon substrate 2 if the clearance 15 is deformed while the etching solution is removed. In contrast, DLC can be removed by dry etching and such a problem can be prevented.

Through the above steps, an infrared sensor is completed including the first thermosensitive elements 1a having a micro-bridge structure embodied by the temperature detecting unit 14 held up above the silicon substrate 2 by means of the support member 13 as shown in FIG. 2A, and the second thermosensitive elements 1b having the temperature detecting unit 14 formed on the first sacrifice layer 5 as shown in FIG. 2B.

MODIFIED EXAMPLE OF FIRST EXAMPLE

FIG. 2A and FIG. 2B are one example of basic structure of the first thermosensitive element 1a and the second thermosensitive element 1b according to the present example, respectively. FIG. 12A and FIG. 12B are a modified example of this structure. As shown in FIG. 12A, an appentice 12 that absorbs an infrared ray near a wavelength of 8 to 12 μm is formed over the first thermosensitive element 1a that senses an incident infrared ray. An appentice 12 over the second thermosensitive element 1b is removed as shown in FIG. 12B. The appentice 12 is coupled to an end portion of the temperature detecting unit 14 of the first thermosensitive element 1a to be positioned above the first thermosensitive element 1a so as to blanket the regions other than the region where the bolometer thin film 7 is disposed. Since an infrared ray that enters the appentice 12 is absorbed by the appentice 12 and resulting heat flows into the bolometer thin film 7 of the temperature detecting unit 14, even the regions including the support member 13, where no bolometer thin film 7 exists, can be effectively used for sensing infrared and the aperture ratio can be increased.

An infrared reflecting film may be formed on the topmost layer of the second thermosensitive element 1b. By covering the second thermosensitive element 1b with an infrared reflecting film, it is possible to keep down a temperature rise in the second thermosensitive element 1b due to an incident infrared ray.

One example of a manufacturing method of the first thermosensitive element 1a and the second thermosensitive element 1b having the structures of FIG. 12A and FIG. 12B will now be explained in detail with reference to FIG. 13A through FIG. 15B.

First, likewise the above, the reflecting film 3 and the contacts 4 are formed on the silicon substrate 2. Next, DLC is deposited on the entire surface of the silicon substrate 2 by plasma CVD method, PVD method, or the like, then the deposited material is patterned with a resist mask thereon, thereby the first sacrifice layer 5 is formed on the regions other than the openings above the contacts 4. Then, the first protection film 6 is formed on the first sacrifice layer 5. Then, the bolometer thin film 7 is formed on a region of the first protection film 6 where the temperature detecting unit 14 is to be formed, and the second protection film 8 for protecting the bolometer thin film 7 is formed. Then, contact holes 16a are formed above the contacts 4 and at end portions of the bolometer thin film 7, the electrode wire 9 is formed, and then the third protection film 10 for protecting the electrode wire 9 is formed. Next, first slits 17 are formed in each first thermosensitive element 1a and a second slit 18 is formed in the region between adjoining thermosensitive elements 1a such that the first sacrifice layer 5 is partially exposed. At this time, since the sacrifice layer 5 is not to be removed from each second thermosensitive element 1b to be kept therein, no first slit 17 or second slit 18 is to be formed in the second thermosensitive element 1b.

Figure 13A:
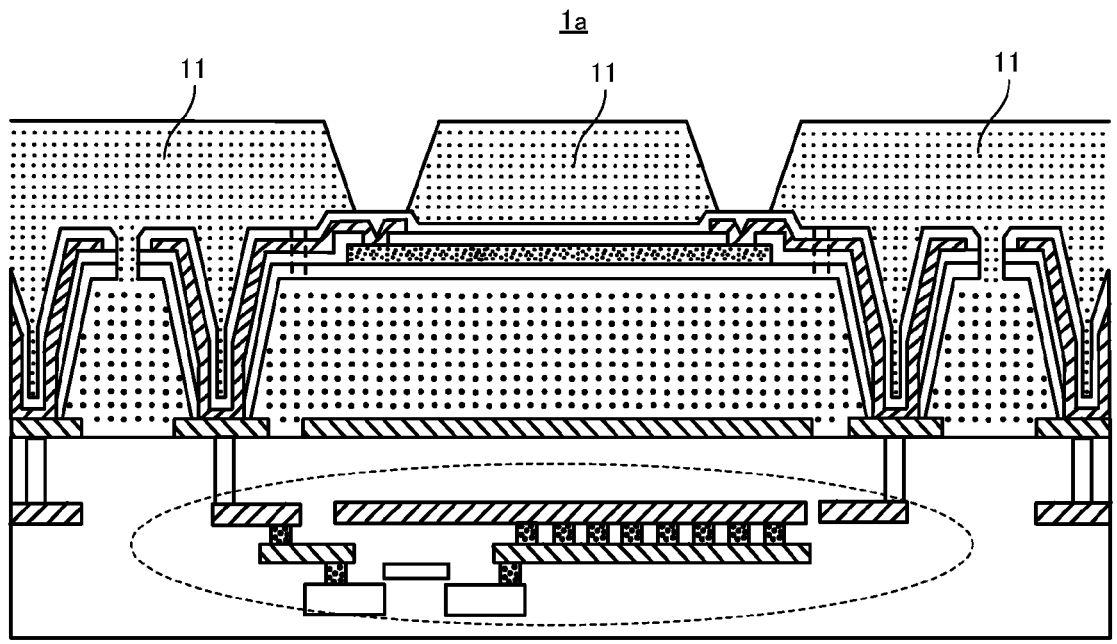
FIG. 13A is a cross sectional view observed in a step of an example manufacturing method of the first thermosensitive element according to the modified example of the first example of the present invention.
Figure 13B:
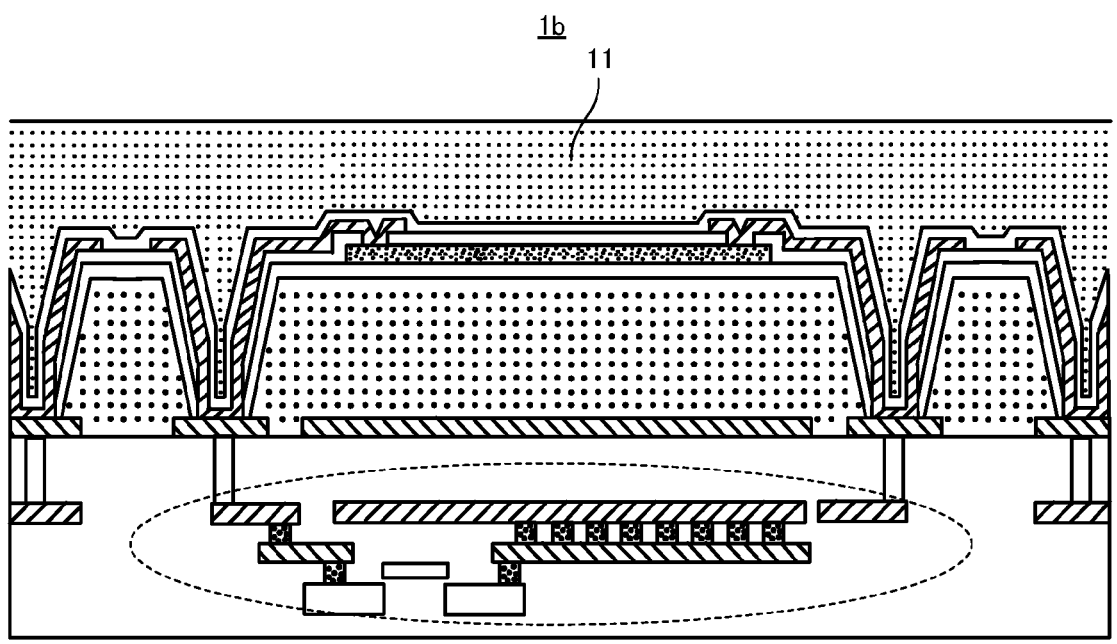
FIG. 13B is a cross sectional view observed in a step of an example manufacturing method of the second thermosensitive element according to the modified example of the first example of the present invention.

Next, DLC is deposited on the entire surface of silicon substrate 2 by plasma CVD method, PVD method, or the like, and the deposited material is patterned with a resist mask, thereby a second sacrifice layer 11 is formed on the regions of the first thermosensitive element 1a other than the neighborhood of the contact holes 16a formed at the end portions of the bolometer thin film 7 of the first thermosensitive element 1a, as shown in FIG. 13A. Here, both the first sacrifice layer 5 and the second sacrifice layer 11 are made of DLC. However, the second sacrifice layer 11 is to be removed after the appentice 12 is formed and irrelevant to the problem of heat transfer that concerns the first sacrifice layer 5, and hence may be made of photosensitive polyimide or the like. In such a case, photosensitive polyimide may be coated over the entire surface of silicon substrate 2, and then exposed and developed such that the second sacrifice layer 11 has a desired pattern. Further, since no appentice is to be formed over the second thermosensitive element 1b, the second sacrifice layer 11 remains on the entire surface of the second thermosensitive element 1b as shown in FIG. 13B. Still further, in a case where an infrared reflecting film is desired on the top of the second thermosensitive element 1b, the second sacrifice layer 11 may be removed from the top of the second thermosensitive element 1b.

Figure 14A:
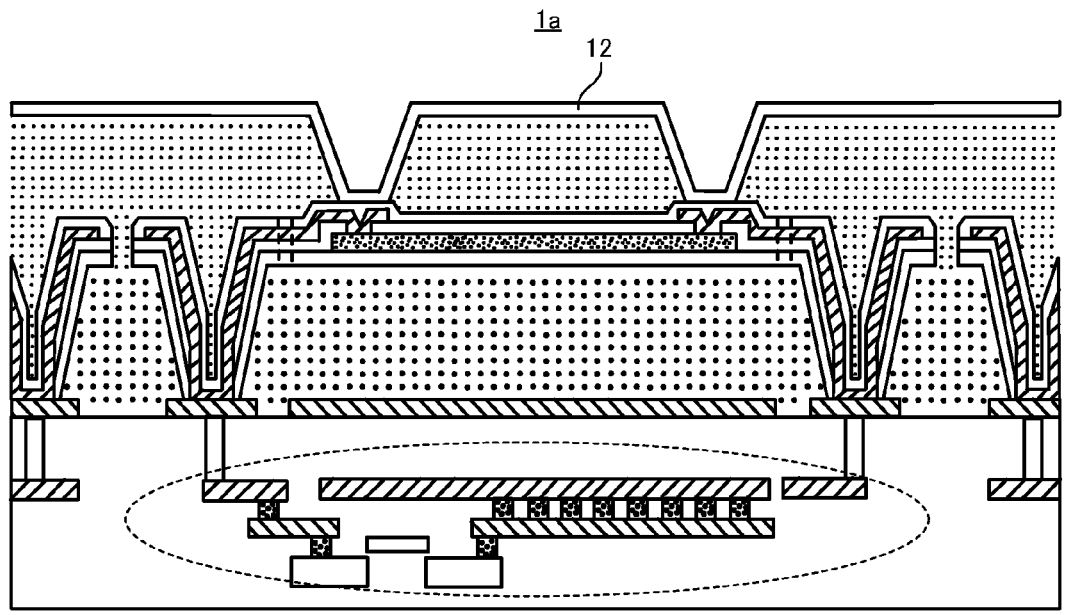
FIG. 14A is a cross sectional view observed in a step of an example manufacturing method of the first thermosensitive element according to the modified example of the first example of the present invention.
Figure 14B:
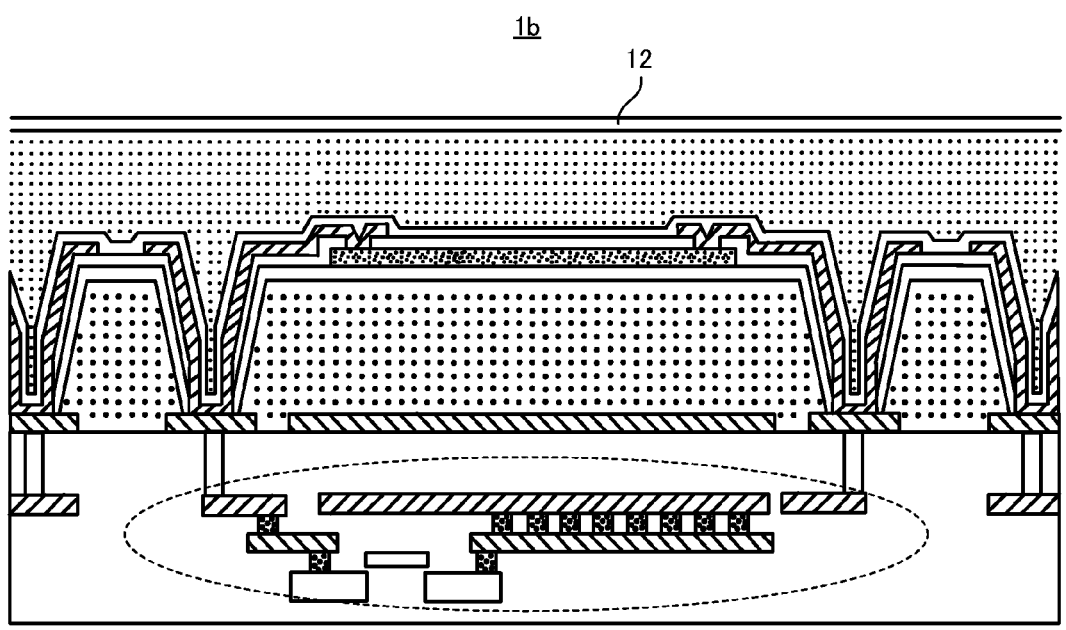
FIG. 14B is a cross sectional view observed in a step of an example manufacturing method of the second thermosensitive element according to the modified example of the first example of the present invention.

Next, a silicon oxide film (SiO, $SiO_2$), a silicon nitride film (SiN, $Si_3N_4$), a silicon oxynitride film (SiON), or the like is deposited by plasma CVD method such that the film has a thickness of about 50 to 500 nm, thereby the appentice 12 for increasing the infrared receiving area of the first thermosensitive element 1a is formed as shown in FIG. 14A and FIG. 14B.

Figure 15A:
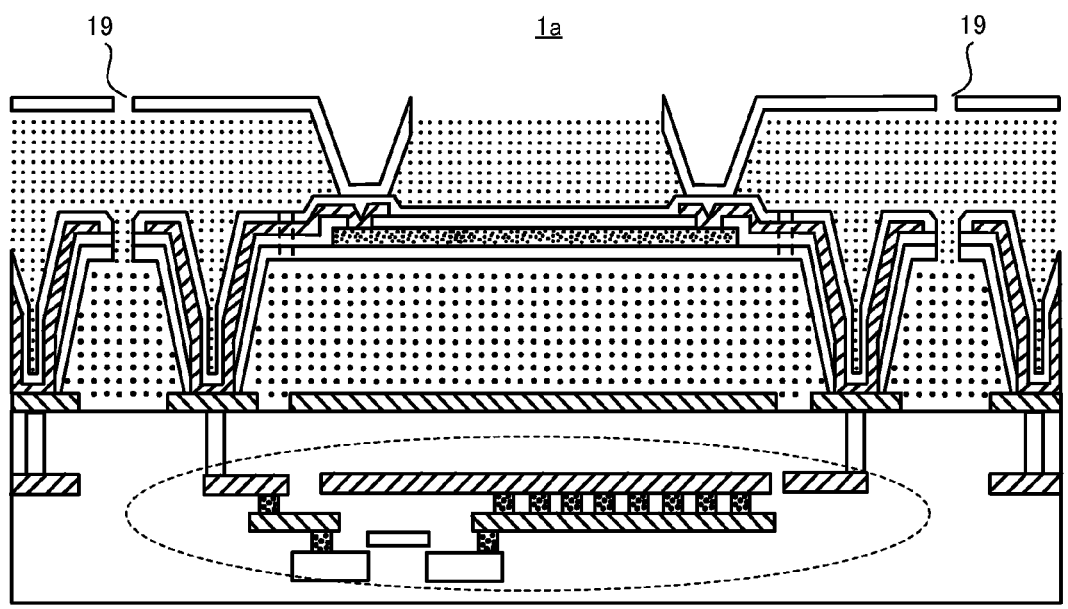
FIG. 15A is a cross sectional view observed in a step of an example manufacturing method of the first thermosensitive element according to the modified example of the first example of the present invention.
Figure 15B:
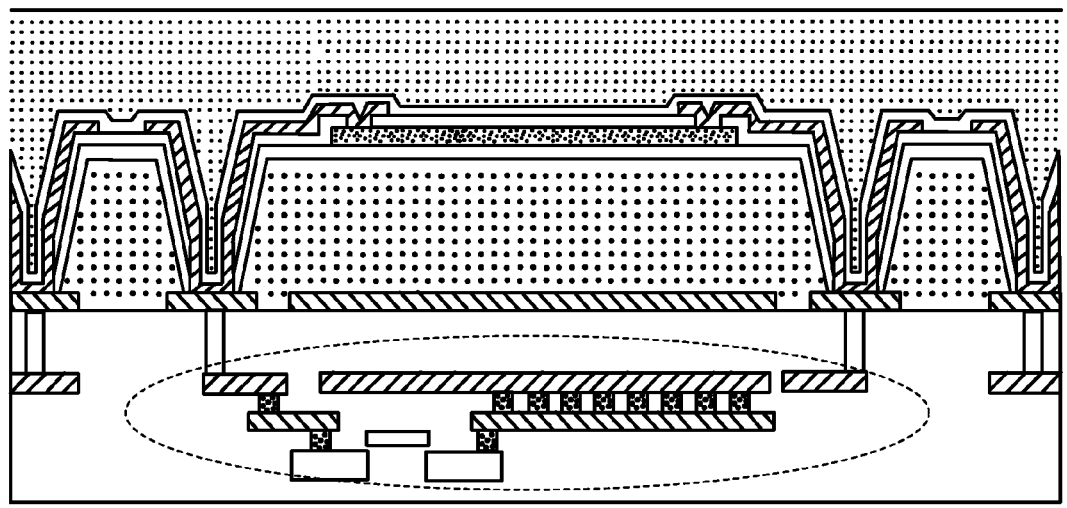
FIG. 15B is a cross sectional view observed in a step of an example manufacturing method of the second thermosensitive element according to the modified example of the first example of the present invention.

Next, plasma etching or the like using $CF_4$, $C_2F_6$, $CHF_3$, or the like is performed to partially etch the appentice 12, such that the top of the temperature detecting unit 14 of the first thermosensitive element 1a is exposed and such that the second sacrifice layer 11 is partially exposed through a third slit 19 that is etched open in the region between adjoining first thermosensitive elements 1a, as shown in FIG. 15A. The appentice 12 over the second thermosensitive element 1b is etched and removed as shown in FIG. 15B.

Then, heating or plasma treatment is performed in an oxygen atmosphere, such that the second sacrifice layer 11 over the first thermosensitive element 1a and over the region between adjoining first thermosensitive elements 1a is removed and the second sacrifice layer 11 over the second thermosensitive element 1b is removed. Then, the first sacrifice layer 5 is removed through the first slits 17 and the second slits 18. At this time, since no first slit 17 or second slit 18 is formed in the second thermosensitive element 1b, the first sacrifice layer 5 remains beneath the temperature detecting unit 14 and between adjoining second thermosensitive elements 1b.

ANOTHER MODIFIED EXAMPLE OF FIRST EXAMPLE

Figure 16A:
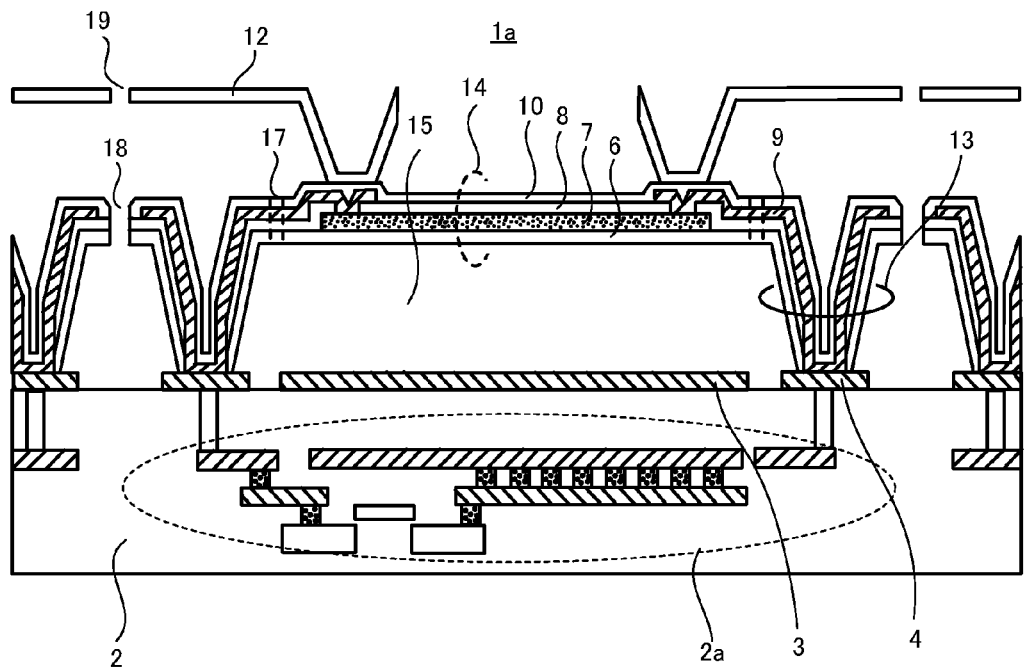
FIG. 16A is a cross sectional view showing an example structure of the first thermosensitive element according to another modified example of the first example of the present invention.
Figure 16B:
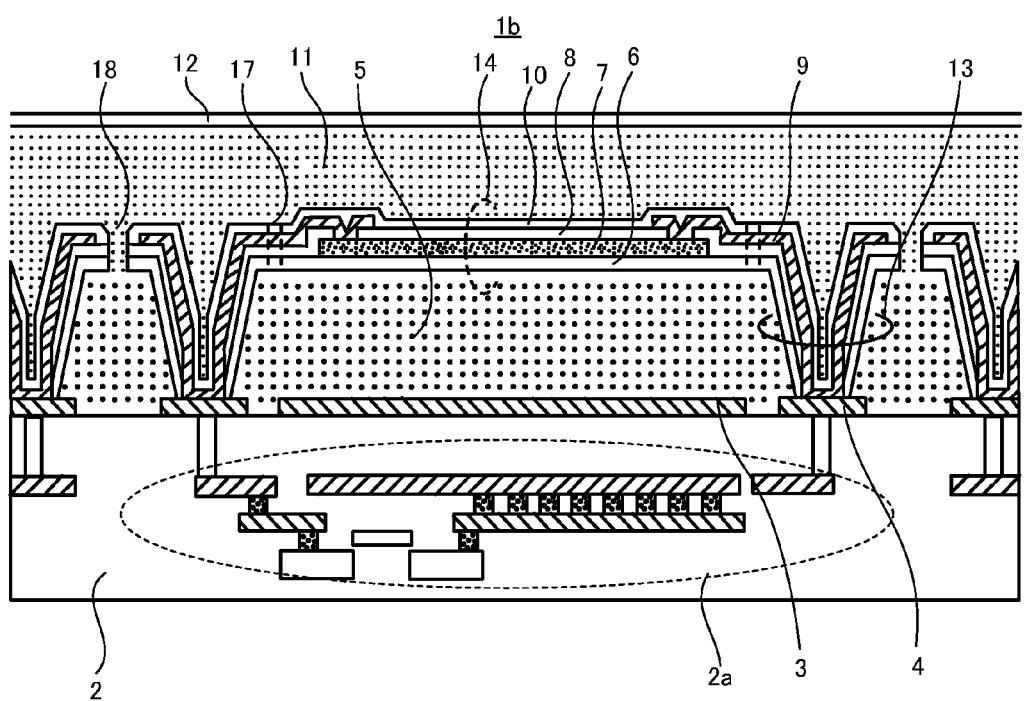
FIG. 16B is a cross sectional view showing an example structure of the second thermosensitive element according to another modified example of the first example of the present invention.

FIG. 12A and FIG. 12B are one example of structure for the case of removing the appentice 12 over the second thermosensitive element 1b. As a modification of this, the appentice 12 may be kept remaining over the second thermosensitive element 1b as shown in FIG. 16A and FIG. 16B. In such a case, the structure of the first thermosensitive element 1a for sensing an entering infrared ray is the same as that of the first thermosensitive element 1a shown in FIG. 12A, while the second thermosensitive element 1b keeps the second sacrifice layer 11 and the appentice 12 existing thereabove as shown in FIG. 16B.

One example of a manufacturing method of the first thermosensitive element 1a and the second thermosensitive element 1b having the structures of FIG. 16A and FIG. 16B will now be explained in detail with reference to FIG. 17A through FIG. 20B.

First, likewise the above, the reflecting film 3 and the contacts 4 are formed on the silicon substrate 2. Then, DLC is deposited on the entire surface of silicon substrate 2 by plasma CVD method, PVD method, or the like, and the deposited material is patterned with a resist mask, thereby the first sacrifice layer 5 is formed on the regions other than the openings above the contacts 4. Then, the first protection film 6 is formed on the first sacrifice layer 5. Then, the bolometer thin film 7 is formed on a region of the first protection film 6 where the temperature detecting unit 14 is to be formed, and the second protection film 8 for protecting the bolometer thin film 7 is formed. Then, contact holes 16a are formed above the contacts 4 and at end portions of the bolometer thin film 7, the electrode wire 9 is formed, and then the third protection film 10 for protecting the electrode wire 9 is formed.

Figure 17A:
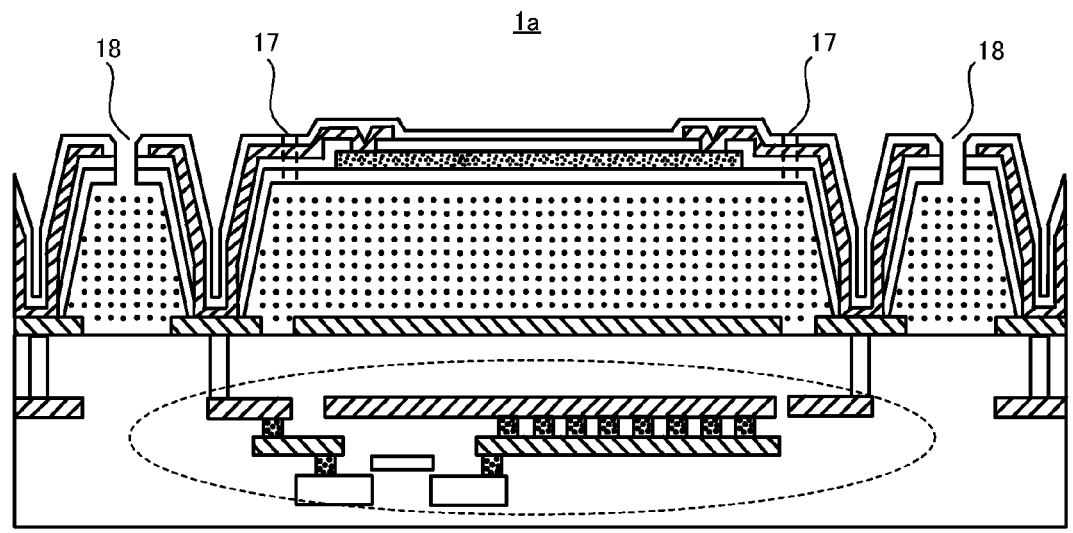
FIG. 17A is a cross sectional view observed in a step of an example manufacturing method of the first thermosensitive element according to another modified example of the first example of the present invention.
Figure 17B:
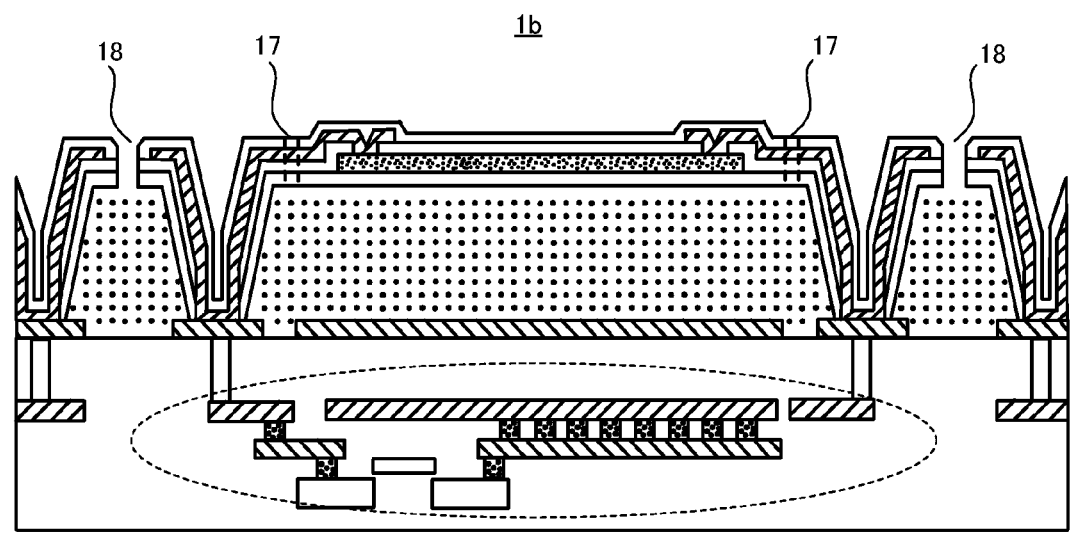
FIG. 17B is a cross sectional view observed in a step of an example manufacturing method of the second thermosensitive element included in an infrared sensor according to another modified example of the first example of the present invention.

Next, plasma etching or the like using $CF_4$, $C_2F_6$, $CHF_3$, or the like is performed to partially etch the first protection film 6, the second protection film 8, and the third protection film 10, such that first slits 17 are formed in each first thermosensitive element 1a and such that a second slit 18 is formed in the region between adjoining first thermosensitive elements 1a, thereby the first sacrifice layer 5 is partially exposed, as shown in FIG. 17A. At this time, since the first sacrifice layer 5 of the second thermosensitive element 1b will be protected by the second sacrifice layer 11 and the appentice 12, first slits 17 and second slits 18 may be formed in the second thermosensitive element 1b as shown in FIG. 17B. It is also possible not to form a first slit 17 and a second slit 18 in the second thermosensitive element 1b.

Figure 18A:
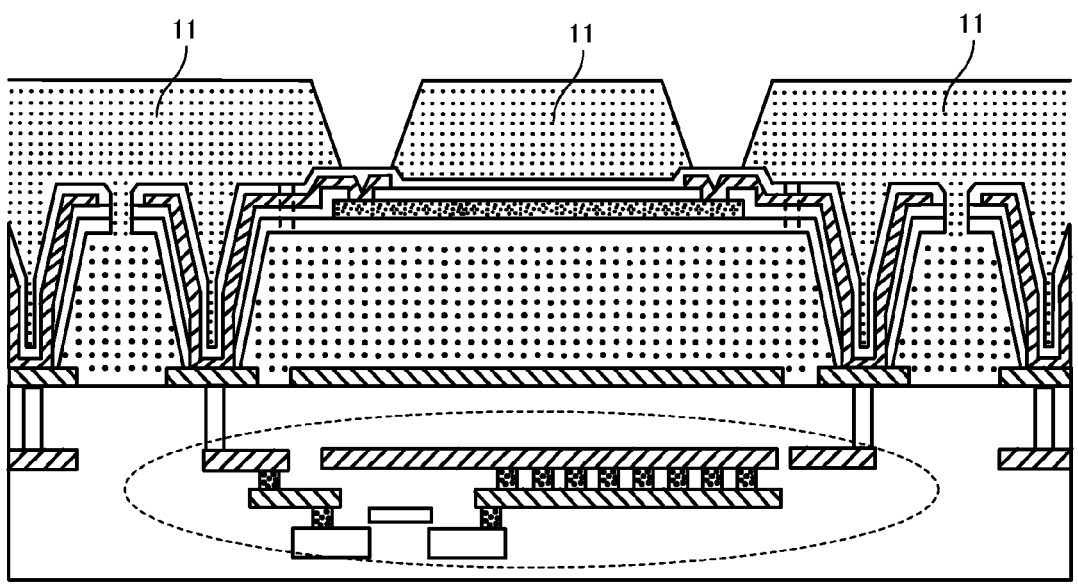
FIG. 18A is a cross sectional view observed in a step of an example manufacturing method of the first thermosensitive element according to another modified example of the first example of the present invention.
Figure 18B:
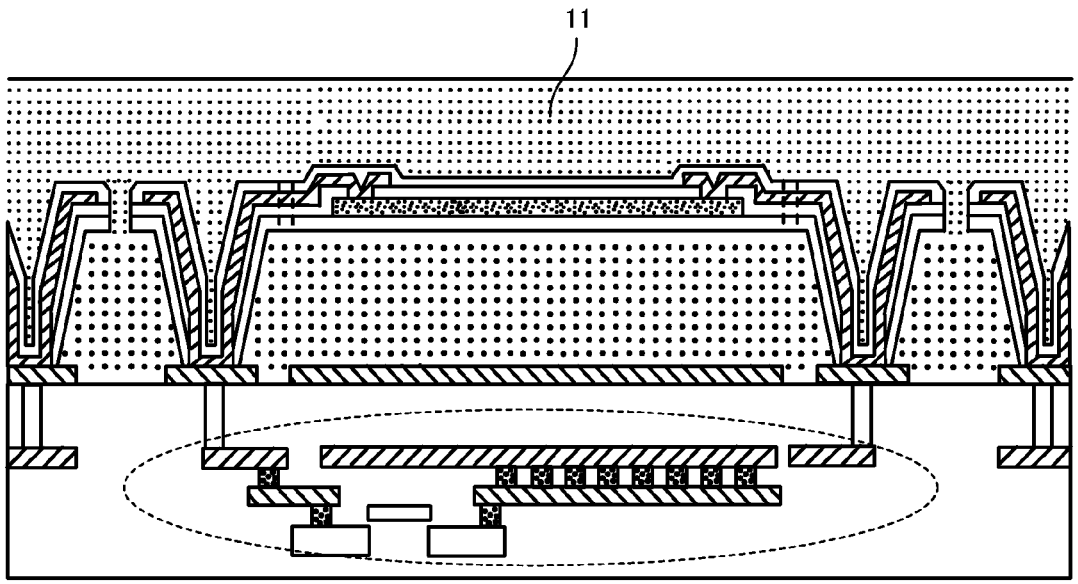
FIG. 18B is a cross sectional view observed in a step of an example manufacturing method of the second thermosensitive element according to another modified example of the first example of the present invention.

Next, DLC is deposited on the entire surface of silicon substrate 2 by plasma CVD method, PVD method or the like, and the deposited material is patterned with a resist mask, thereby the second sacrifice layer 11 is formed on the regions of the first thermosensitive element 1a other than the neighborhood of the contact holes 16 formed at the end portions of the bolometer thin film 7 of the first thermosensitive element 1a as shown in FIG. 18A. The second sacrifice layer 11 is formed all over the second thermosensitive element 1b as shown in FIG. 18B.

Figure 19A:
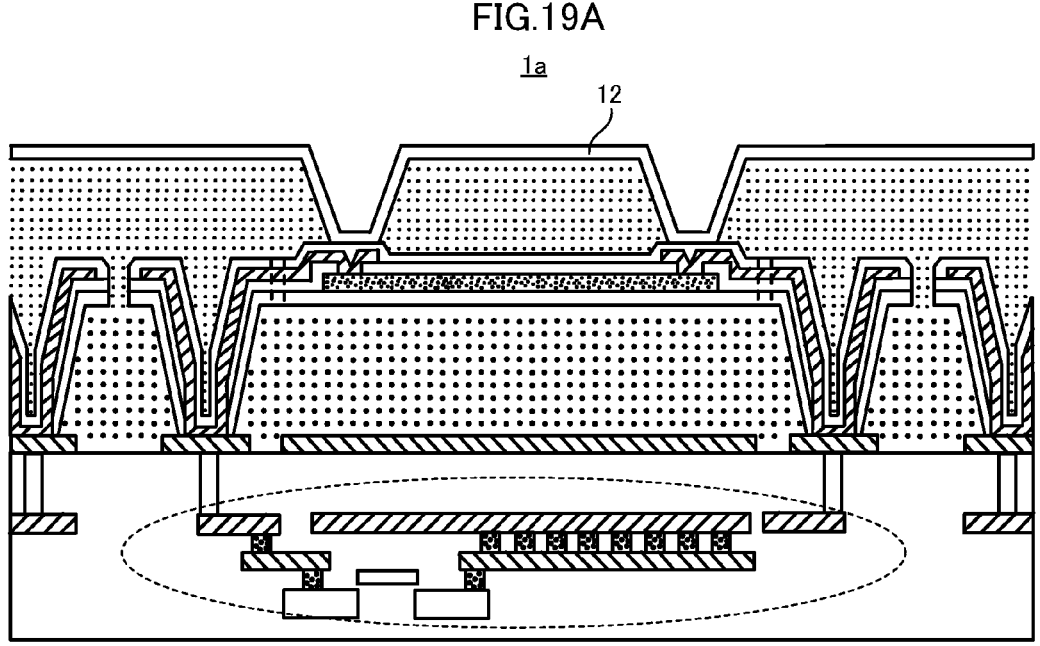
FIG. 19A is a cross sectional view observed in a step of an example manufacturing method of the first thermosensitive element according to another modified example of the first example of the present invention.
Figure 19B:
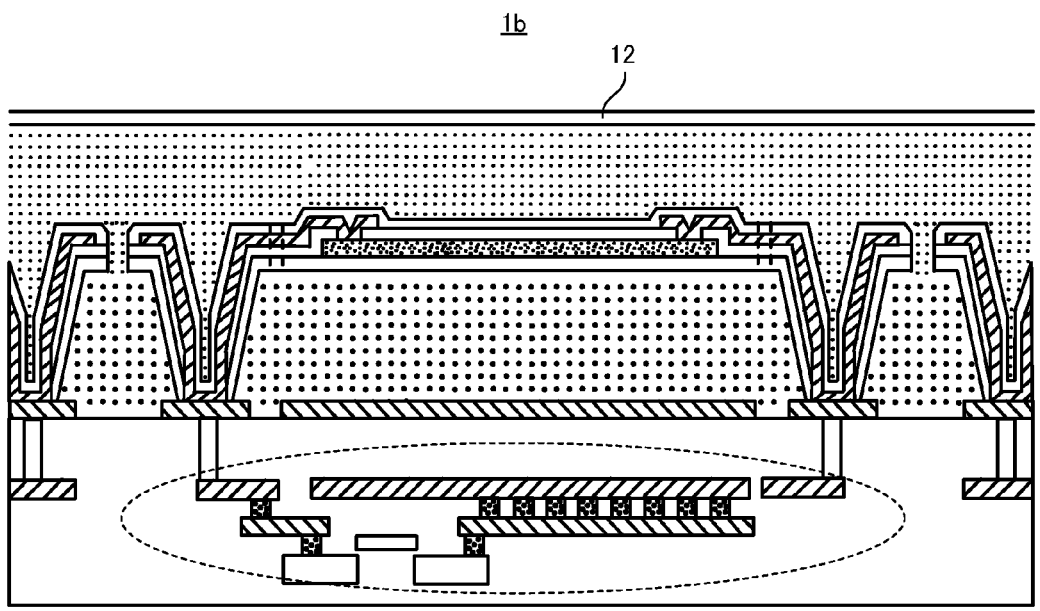
FIG. 19B is a cross sectional view observed in a step of an example manufacturing method of the second thermosensitive element according to another modified example of the first example of the present invention.

Next, a silicon oxide film (SiO, $SiO_2$), a silicon nitride film (SiN, $Si_3N_4$), a silicon oxynitride film (SiON), or the like is deposited by plasma CVD method such that the film has a thickness of about 50 to 500 nm, thereby the appentice 12 is formed as shown in FIG. 19A and FIG. 19B, for increasing the infrared receiving area of the first thermosensitive element 1a and for protecting the first sacrifice layer 5 of the second thermosensitive element 1b.

Figure 20A:
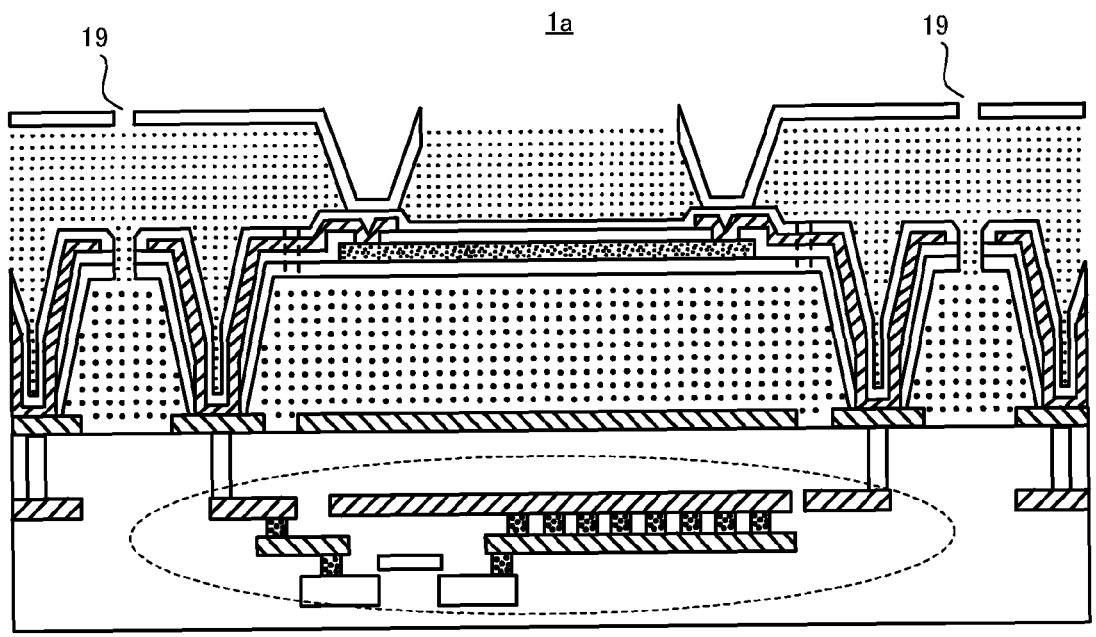
FIG. 20A is a cross sectional view observed in a step of an example manufacturing method of the first thermosensitive element according to another modified example of the first example of the present invention.
Figure 20B:
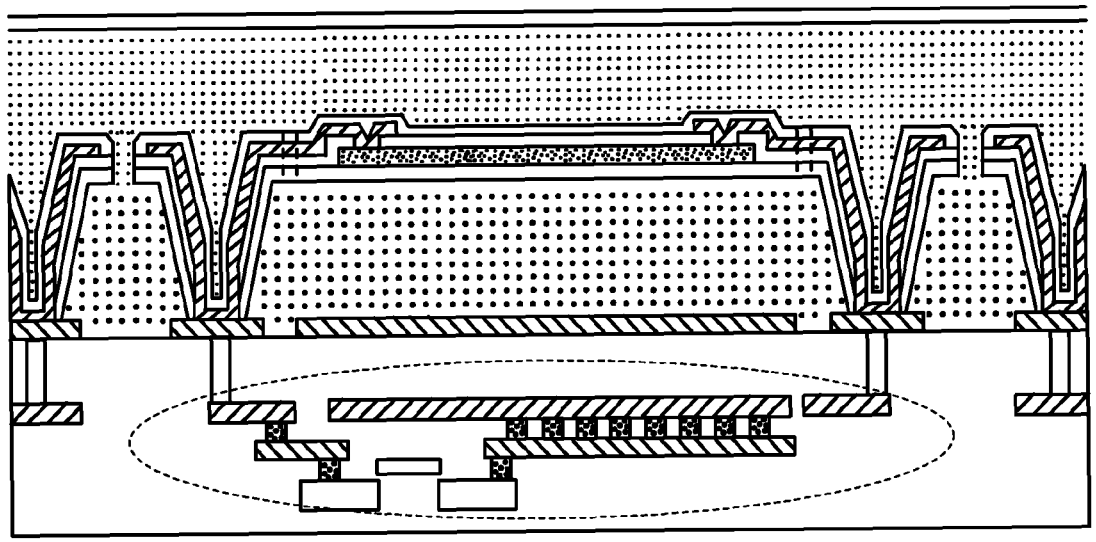
FIG. 20B is a cross sectional view observed in a step of an example manufacturing method of the second thermosensitive element according to another modified example of the first example of the present invention.

Next, plasma etching or the like using $CF_4$, $C_2F_6$, $CHF_3$, or the like is performed to partially etch the appentice 12, such that the top of the temperature detecting unit 14 of the first thermosensitive element 1a is exposed and such that the second sacrifice layer 11 is partially exposed through a third slit 19 that is etched open in the region between adjoining first thermosensitive elements 1a, as shown in FIG. 20A. The appentice 12 over the second thermosensitive element 1b and over the region between adjoining second thermosensitive elements 1b are not etched but kept remaining, and no third slit 19 is etched open, as shown in FIG. 20B.

Then, heating or plasma processing is performed in an oxygen atmosphere to remove the second sacrifice layer 11 over the first thermosensitive element 1a and to remove the second sacrifice layer 11 over the region between adjoining first thermosensitive elements 1a through the third slit 19. Then, the first sacrifice layer 5 is removed through the first slits 17 and the second slits 18. At this time, since the appentice 12 remains over the second thermosensitive element 1b and over the region between adjoining second thermosensitive elements 1b, the second sacrifice layer 11 over the second thermosensitive element 1b and over the region between adjoining second thermosensitive elements 1b remains with also the first sacrifice layer 5 remaining.

SECOND EXAMPLE

Figure 21A:
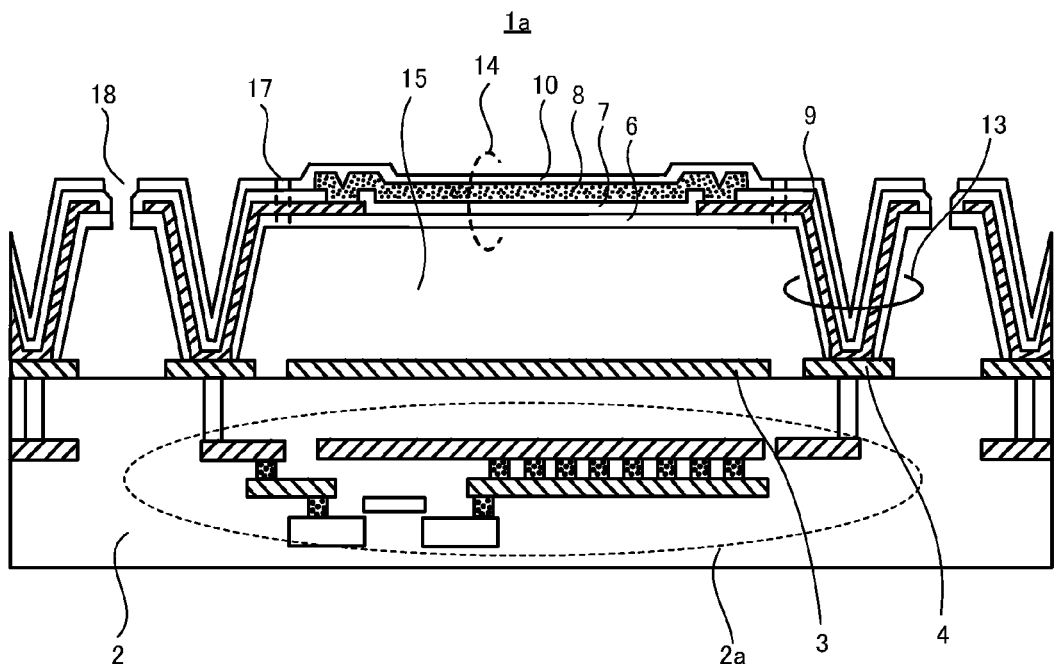
FIG. 21A is a cross sectional view showing an example structure of the first thermosensitive element according to a second example of the present invention.
Figure 21B:
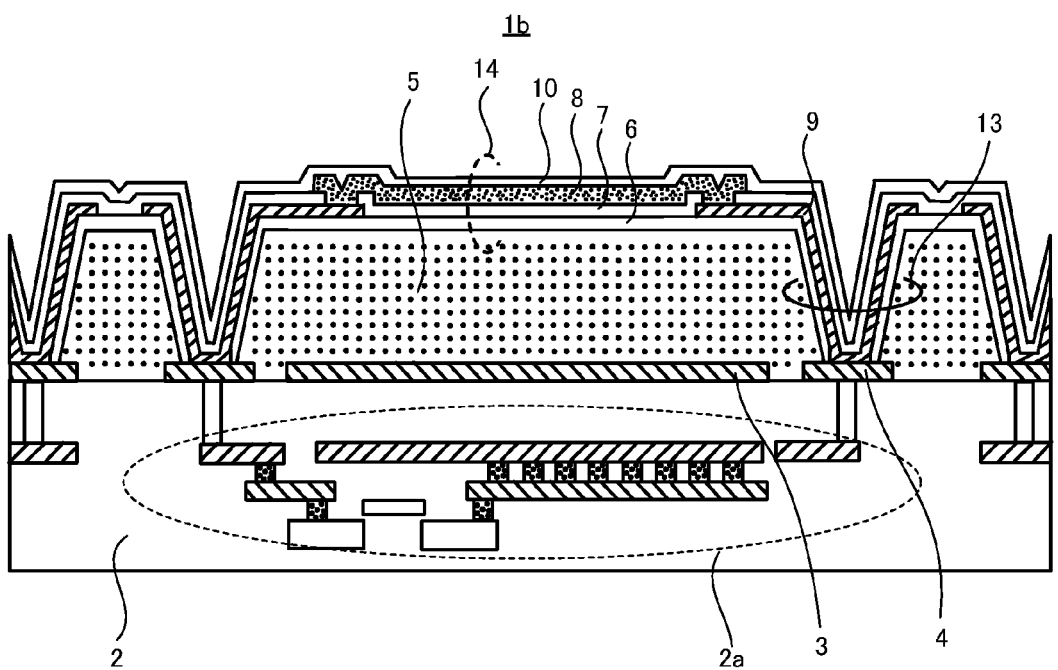
FIG. 21B is a cross sectional view showing an example structure of the second thermosensitive element according to the second example of the present invention.

Next, an infrared sensor and a manufacturing method thereof according to a second example of the present invention will be explained with reference to FIG. 21A through FIG. 27. FIG. 21A and FIG. 21B are diagrams exemplarily showing example structures of a first thermosensitive element 1a and a second thermosensitive element 1b according to the second example respectively. FIG. 21A is an example cross sectional view of the first thermosensitive element 1a for sensing an infrared ray, and FIG. 21B is an example cross sectional view of the second thermosensitive element 1b for correcting an output voltage of the first thermosensitive element 1a. FIG. 22 through FIG. 27 are cross sectional views that are observed in the manufacturing steps of an example manufacturing method of the first thermosensitive element 1a and the second thermosensitive element 1b according to the present example.

In the first example described above, the electrode wire 9 is formed as an overlying layer of the bolometer thin film 7, but the electrode wire 9 may be formed as an underlying layer to have the bolometer thin film 7 thereabove as shown in FIG. 21A and FIG. 21B. One example of a manufacturing method of the first thermosensitive element 1a and the second thermosensitive element 1b having this structure will be explained with reference to FIG. 22 through FIG. 27.

First, likewise the first example, the reflective film 3 and the contacts 4 are formed on the silicon substrate 2. Next, DLC is deposited on the entire surface of silicon substrate 2 by plasma CVD method, PVD method, or the like, and the deposited material is patterned with a resist mask, thereby the first sacrifice layer 5 is formed on the regions other than openings above the contacts 4.

Figure 22:
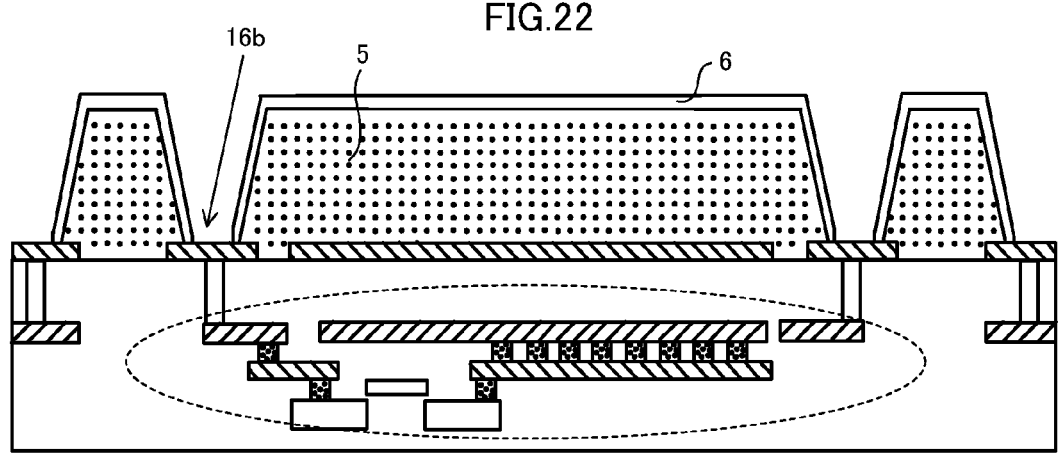
FIG. 22 is a cross sectional view observed in a step of an example manufacturing method of the first thermosensitive element and the second thermosensitive element according to the second example of the present invention.

Next, a silicon oxide film (SiO, $SiO_2$), a silicon nitride film (SiN, $Si_3N_4$), a silicon oxynitride film (SiON), or the like is deposited on the first sacrifice layer 5 by plasma CVD method or the like such that the film has a thickness of about 50 to 500 nm, thereby the first protection film 6 is formed as shown in FIG. 22. After this, the first protection film 6 is removed from the top of the contacts 4, thereby contact holes 16b are formed.

Figure 23:
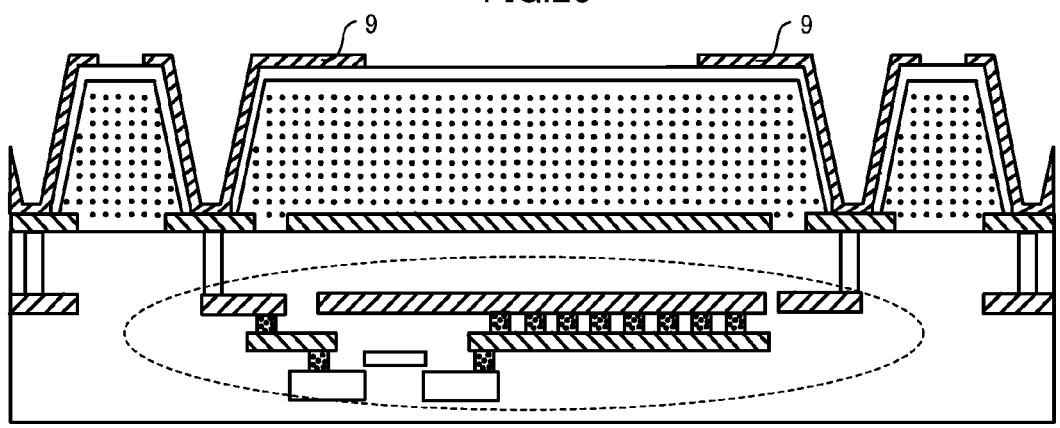
FIG. 23 is a cross sectional view observed in a step of an example manufacturing method of the first thermosensitive element and the second thermosensitive element according to the second example of the present invention.

Next, a metal such as Al, Cu, Au, Ti, W, Mo, etc. is deposited by sputtering method or the like such that the deposited metal has a film thickness of about 10 to 200 nm, then the film is patterned with a resist mask, thereby the electrode wire 9 is formed as shown in FIG. 23. The electrode wire 9 is connected to the reading circuit 2a in the silicon substrate 2 through the contact holes 16b.

Figure 24:
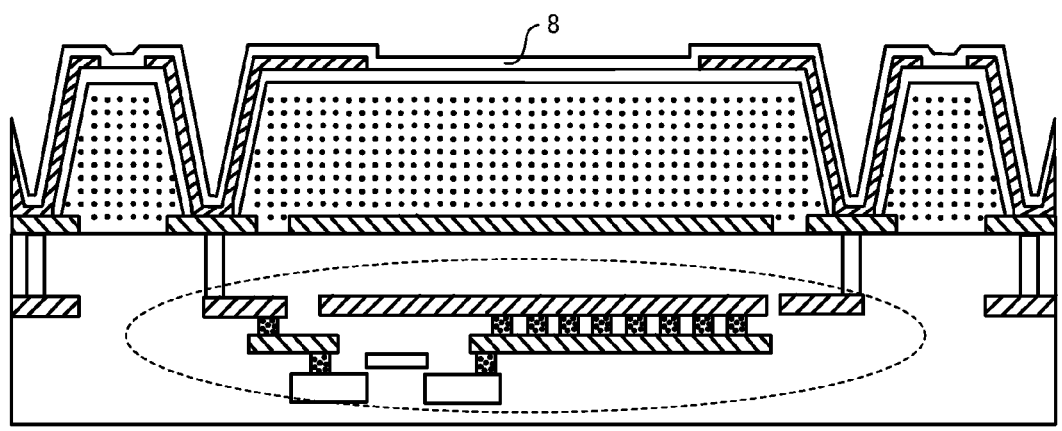
FIG. 24 is a cross sectional view observed in a step of an example manufacturing method of the first thermosensitive element and the second thermosensitive element according to the second example of the present invention.
Figure 25:
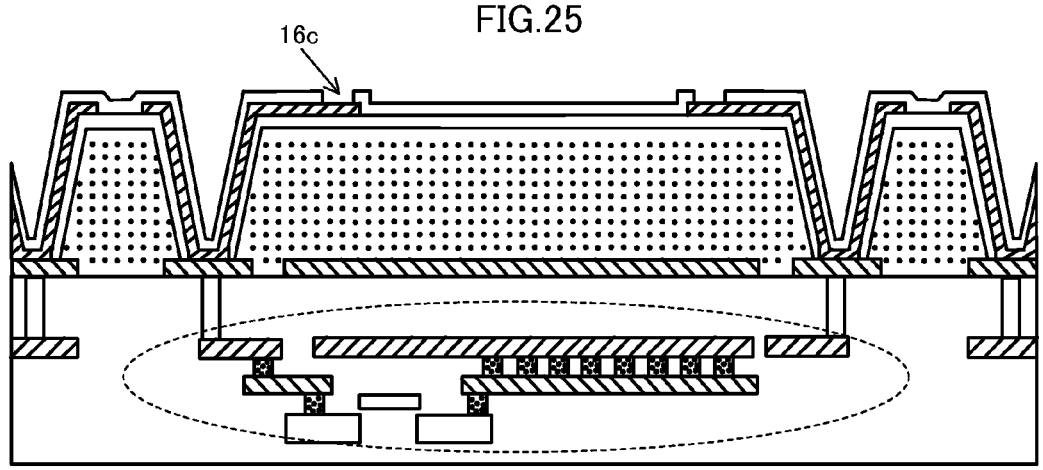
FIG. 25 is a cross sectional view observed in a step of an example manufacturing method of the first thermosensitive element and the second thermosensitive element according to the second example of the present invention.

Next, a silicon oxide film (SiO, $SiO_2$), a silicon nitride film (SiN, $Si_3N_4$), a silicon oxynitride film (SiON), or the like is deposited by plasma CVD method or the like such that the film has a thickness of about 10 to 200 nm, thereby the second protection film 8 for protecting the electrode wire 9 is formed as shown in FIG. 24. After this, the second protection film 8 that exists at end portions of the electrode wire 9 on the first sacrifice layer 5 is removed, thereby contact holes 16c are formed as shown in FIG. 25.

Figure 26:
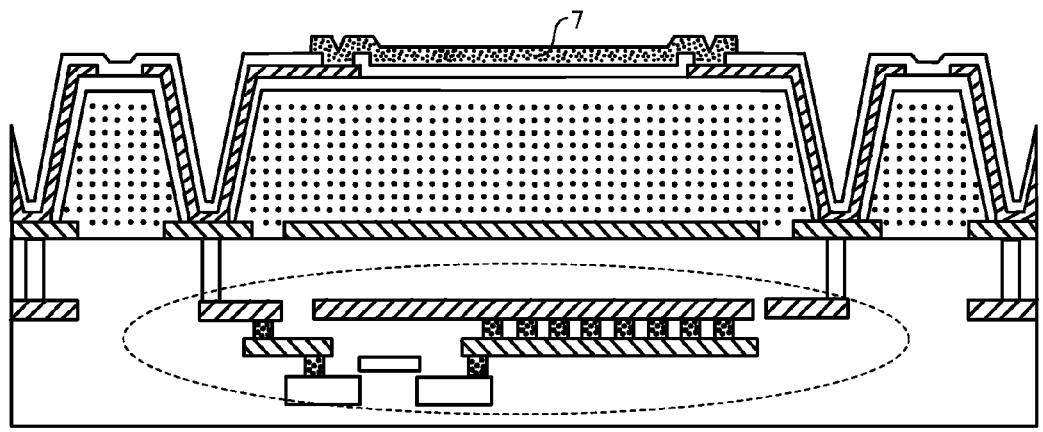
FIG. 26 is a cross sectional view observed in a step of an example manufacturing method of the first thermosensitive element and the second thermosensitive element according to the second example of the present invention.

Next, vanadium oxide ($V_2O_3$, VOx, or the like), titanium oxide (TiOx), or the like is deposited on the second protection film 8 by reactive sputtering in an oxygen atmosphere or the like, such that the deposited material has a film thickness of about 10 to 200 nm, and then the film is patterned with a resist mask, thereby the bolometer thin film 7 is formed at where the temperature detecting unit 14 is to be formed, as shown in FIG. 26. At this time, the bolometer thin film 7 is formed to be overlaid on the end portions of the electrode wire 9, such that the bolometer thin film 7 and the electrode wire 9 are connected via the contact holes 16c.

Figure 27:
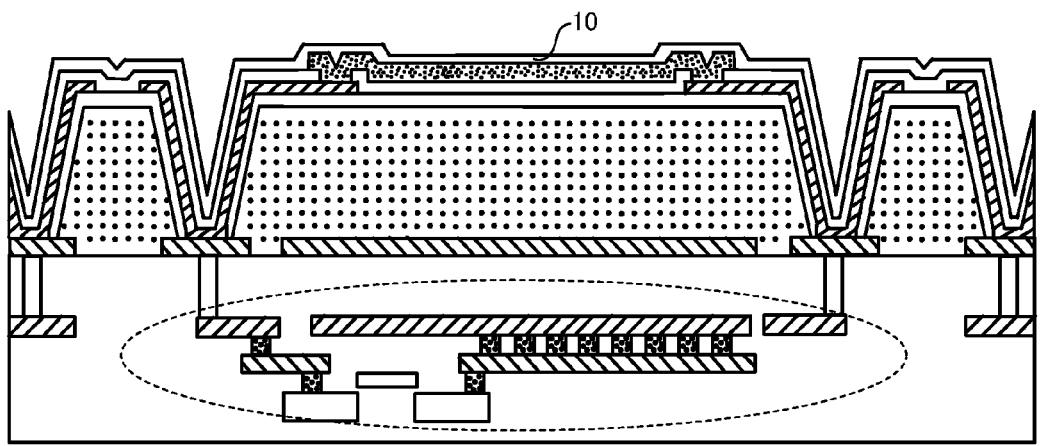
FIG. 27 is a cross sectional view observed in a step of an example manufacturing method of the first thermosensitive element and the second thermosensitive element according to the second example of the present invention.

Next, a silicon oxide film (SiO, $SiO_2$), a silicon nitride film (SiN, $Si_3N_4$), a silicon oxynitride film (SiON), or the like is deposited by plasma CVD method or the like such that the film has a thickness of about 50 to 500 nm, thereby the third protection film 10 for protecting the bolometer thin film 7 is formed as shown in FIG. 27.

After this, likewise the first example, the first protection film 6, the second protection film 8, and the third protection film 10 are partially etched, such that first slits 17 are formed in each first thermosensitive element 1a and a second slit 18 is formed in the region between adjoining first thermosensitive elements 1a, thereby the first sacrifice layer 5 is partially exposed. Then, heating or plasma treatment is performed in an oxygen atmosphere to remove the first sacrifice layer 5 through the first slits 17 and the second slits 18. At this time, since no first slit 17 or second slit 18 is formed in the second thermosensitive element 1b, the first sacrifice layer 5 remains beneath the second thermosensitive element 1b and in the region between adjoining second thermosensitive elements 1b.

Through the above steps, an infrared sensor is completed including the first thermosensitive elements 1a having a micro-bridge structure embodied by the temperature detecting unit 14 held up above the silicon substrate 2 by means of the support member 13 as shown in FIG. 21A, and the second thermosensitive elements 1b having the temperature detecting unit 14 formed on the first sacrifice layer 5 as shown in FIG. 21B.

Likewise the first example, an appentice 12 may be formed over the first thermosensitive element 1a. In such a case, first slits 17 are formed in each first thermosensitive element 1a and a second slit 18 is formed in the region between adjoining first thermosensitive elements 1a to partially expose the first sacrifice layer 5. Then, a second sacrifice layer 11 is formed on the regions other than the neighborhood of the contact holes 16c formed at the end portions of the bolometer thin film 7. Then, an appentice 12 is formed over the first thermosensitive element 1a and then the appentice 12 over the first thermosensitive element 1a is partially etched such that the top of the temperature detecting unit 14 of the first thermosensitive element 1a is exposed, and such that the second sacrifice layer 11 is partially exposed through a third slit 19 that is etched open in the region between adjoining first thermosensitive elements 1a. After this, heating or plasma treatment is performed in an oxygen atmosphere to remove the second sacrifice layer 11 that exists over the first thermosensitive element 1a and over the region between adjoining first thermosensitive elements 1a and to remove the second sacrifice layer 11 over the second thermosensitive element 1b. Then, the first sacrifice layer 5 is removed through the first slits 17 and the second slits 18. At this time, since no first slit 17 or second slit 18 is formed in the second thermosensitive element 1b, the first sacrifice layer 5 remains beneath the second thermosensitive element 1b and in the region between adjoining second thermosensitive elements 1b.

The second sacrifice layer 11 and the appentice 12 may be kept remaining over the second thermosensitive element 1b. In such a case, first slits 17 are formed in the first thermosensitive element 1a (and in the second thermosensitive element 1b if necessary), and a second slit 18 is formed in the region between adjoining first thermosensitive elements 1a (and in the region between adjoining second thermosensitive elements 1b if necessary), such that the first sacrifice layer 5 is partially exposed. Then, a second sacrifice layer 11 is formed on the regions other than the neighborhood of the contact holes 16c formed at the end portions of the bolometer thin film 7. Then, an appentice 12 is formed over the first thermosensitive element 1a and over the second thermosensitive element 1b, and the appentice 12 over the first thermosensitive element 1a is partially etched such that the top of the temperature detecting unit 14 of the first thermosensitive element 1a is exposed and such that the second sacrifice layer 11 is partially exposed through a third slit 19 that is etched open in the region between adjoining first thermosensitive elements 1a. After this, heating or plasma treatment is performed in an oxygen atmosphere to remove the second sacrifice layer 11 over the first thermosensitive element 1a and to remove the second sacrifice layer 11 over the region between adjoining first thermosensitive elements 1a through the third slit 19. Then, the first sacrifice layer 5 beneath the first thermosensitive element 1a is removed through the first slits 17 and the second slits 18. At this time, since the appentice 12 is kept remaining over the second thermosensitive element 1b, the first sacrifice layer 5 remains beneath the second thermosensitive element 1b and in the region between adjoining second thermosensitive elements 1b.

THIRD EXAMPLE

Figure 28A:
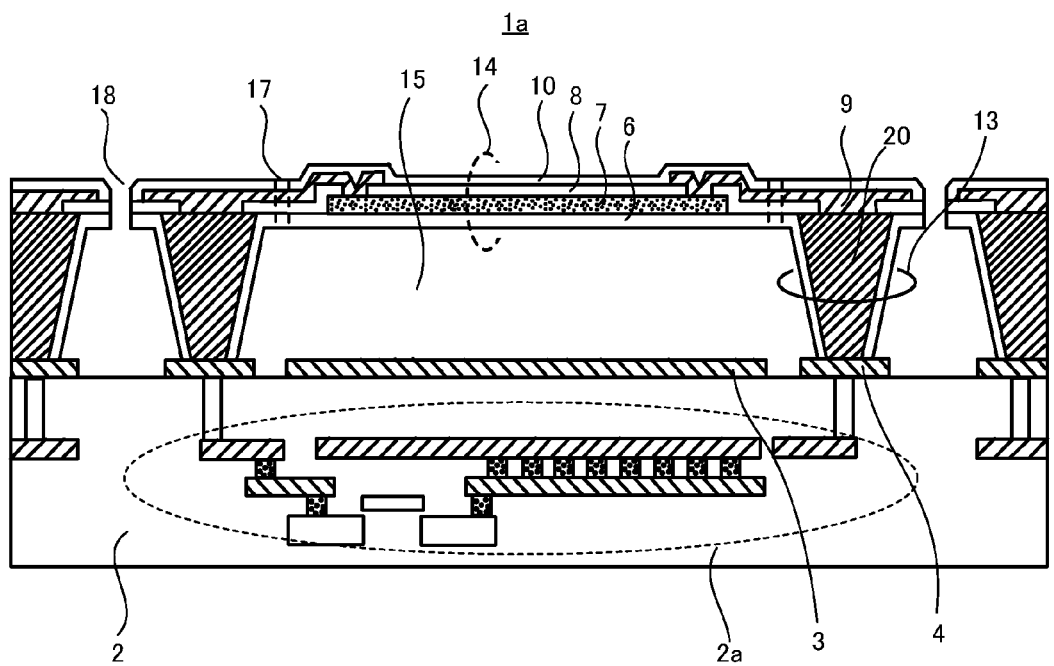
FIG. 28A is a cross sectional view showing an example structure of the first thermosensitive element according to a third example of the present invention.
Figure 28B:
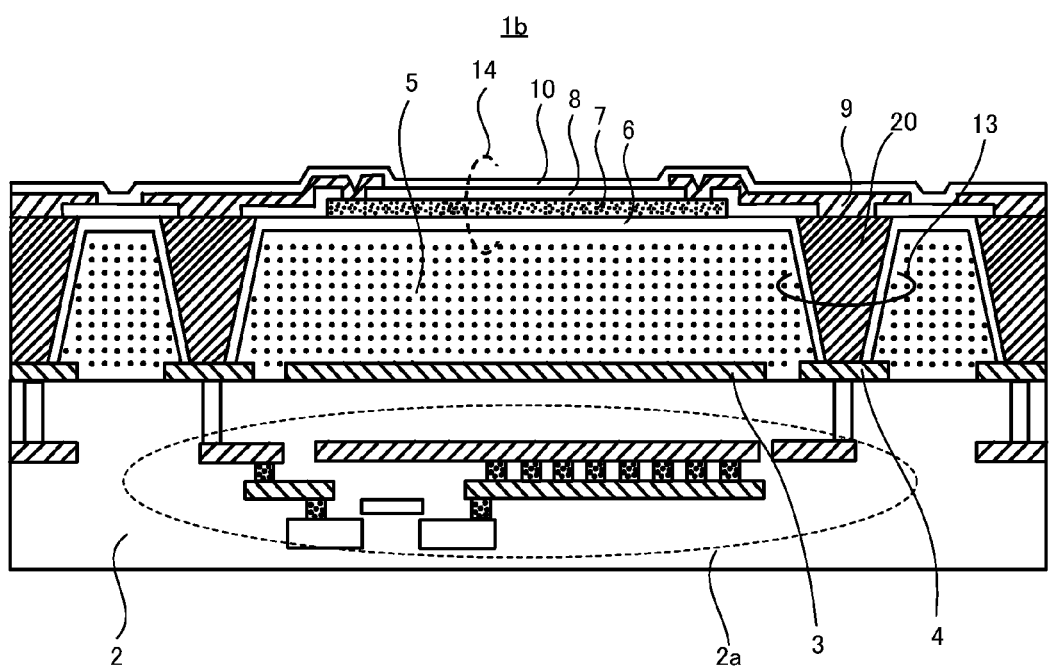
FIG. 28B is a cross sectional view showing an example structure of the second thermosensitive element according to the third example of the present invention.

Next, an infrared sensor and a manufacturing method thereof according to a third example of the present invention will be explained with reference to FIG. 28A through FIG. 35. FIG. 28A and FIG. 28B are diagrams exemplarily showing example structures of a first thermosensitive element 1a and a second thermosensitive element 1b according to the third example respectively. FIG. 28A is an example cross sectional view of the first thermosensitive element 1a for sensing an infrared ray, and FIG. 28B is an example cross sectional view of the second thermosensitive element 1b for correcting an output voltage of the first thermosensitive element 1a. FIG. 29 through FIG. 35 are cross sectional views that are observed in the manufacturing steps of an example manufacturing method of the first thermosensitive element 1a and the second thermosensitive element 1b according to the present example.

In the first and second examples described above, the support member 13 is a column that has an opening thereinside. In a case where DLC is used as the first sacrifice layer 5, it is safe to consider that the sides of the opening inside the support member 13 are almost upright. When the electrode wire 9 is formed by sputtering or the like on the sides that are upright, the electrode wire 9 might be deposited thin to make its resistance high or the support member 13 might spoil its strength. Meanwhile, since DLC is very rigid and hardly deforms as said above, it can be used for various processes.

Hence, according to the present example, the support member 13 of the first thermosensitive element 1a and the second thermosensitive element 1b has its inside opening embedded with metal or the like and the top of the support member 13 is flattened and the electrode wire 9 is horizontally leaded out from the top, as shown in FIG. 28A and FIG. 28B. The electrode wire 9 and the contact 4 are electrically connected via an embedded layer 20.

One example manufacturing method of the first thermosensitive element 1a and the second thermosensitive element 1b having this structure will be explained with reference to FIG. 29 through FIG. 35.

First, likewise the first example, the reflecting film 3 and the contacts 4 are formed on the silicon substrate 2. Then, DLC is deposited on the entire surface of silicon substrate 2 by plasma CVD method, PVD method, or the like, and then the deposited material is patterned with a resist mask, thereby the first sacrifice layer 5 is formed on the regions other than openings above the contacts 4. Then, the first protection film 6 is formed on the first sacrifice layer 5.

Figure 29:
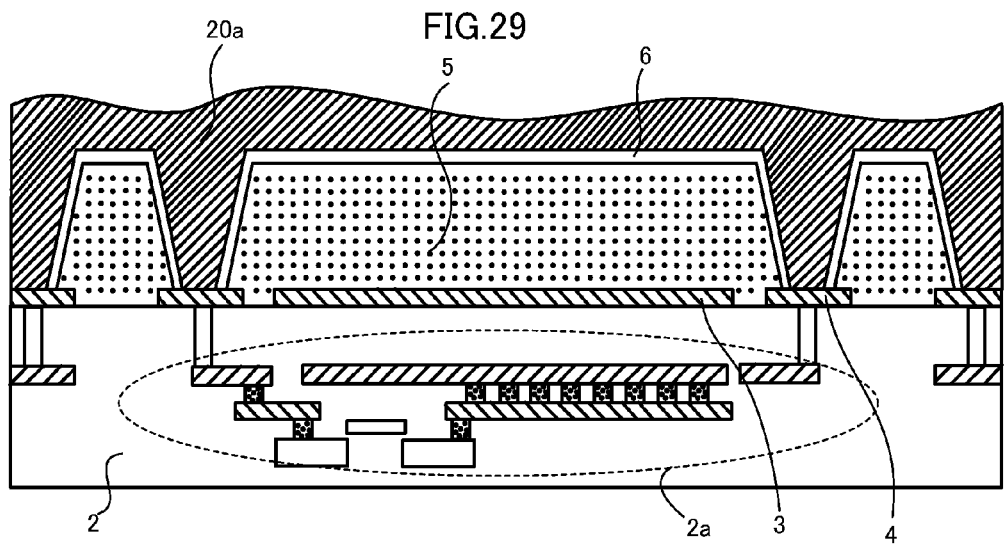
FIG. 29 is a cross sectional view observed in a step of an example manufacturing method of the first thermosensitive element and the second thermosensitive element according to the third example of the present invention.

Next, Cu or the like is deposited by sputtering method, plating method, or the like to embed the openings above the contacts 4 of the first thermosensitive element 1a and the second thermosensitive element 1b with a metal 20a, as shown in FIG. 29. The metal 20a may be a material that has a small electric resistance to connect the contact 4 and the electrode wire 9, and can be polished.

Figure 30:
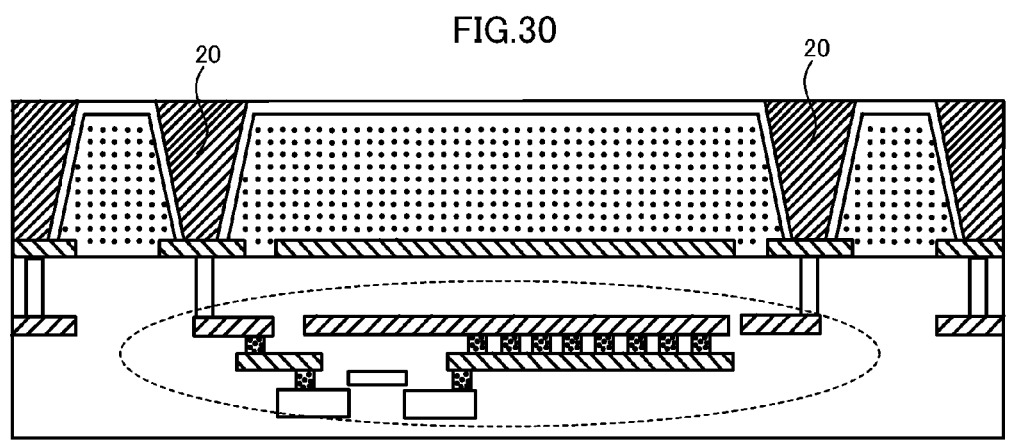
FIG. 30 is a cross sectional view observed in a step of an example manufacturing method of the first thermosensitive element and the second thermosensitive element according to the third example of the present invention.

Next, the metal 20a over the first sacrifice layer 5 is cut by mechanical polishing or mechanochemical polishing, thereby the embedded layer 20 is formed in the opening of the support member 13 of the first thermosensitive element 1a and the second thermosensitive element 1b, as shown in FIG. 30. The embedded layer 20 formed in the first thermosensitive element 1a is electrically insulated from the embedded layer 20 in an adjoining first thermosensitive element 1a. Likewise, the embedded layer 20 formed in the second thermosensitive element 1b is electrically insulated from the embedded layer 20 in an adjoining second thermosensitive element 1b. The polishing here saves the first protection film 6. However, for example, the first protection film 6 on the top of the first sacrifice layer 5 may be cut out and then a new first protection film 6 may be formed thereon.

Figure 31:
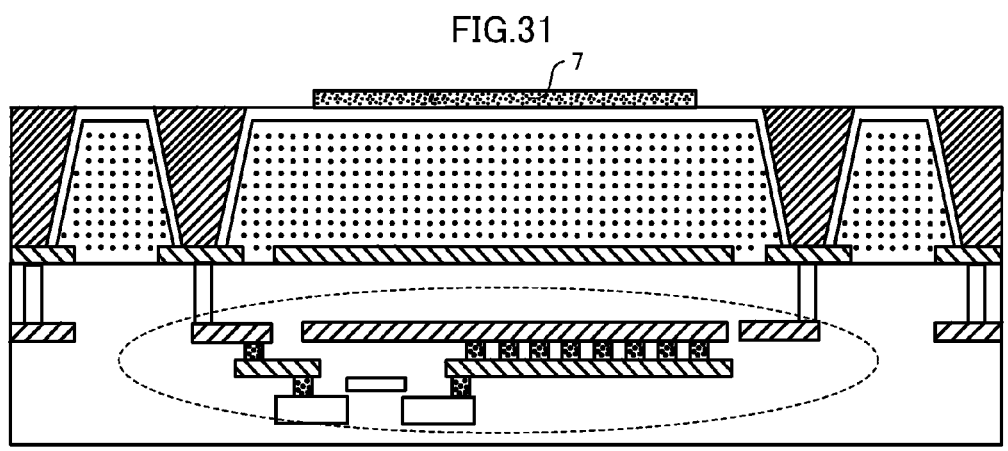
FIG. 31 is a cross sectional view observed in a step of an example manufacturing method of the first thermosensitive element and the second thermosensitive element according to the third example of the present invention.

Next, vanadium oxide ($V_2O_3$, VOx, or the like), titanium oxide (TiOx), or the like is deposited on the first protection film 6 by reactive sputtering or the like in an oxygen atmosphere such that the deposited material has a film thickness of about 10 to 200 nm, and then the film is patterned with a resist mask, thereby the bolometer thin film 7 is formed at where the temperature detecting unit 14 is to be formed, as shown in FIG. 31.

Figure 32:
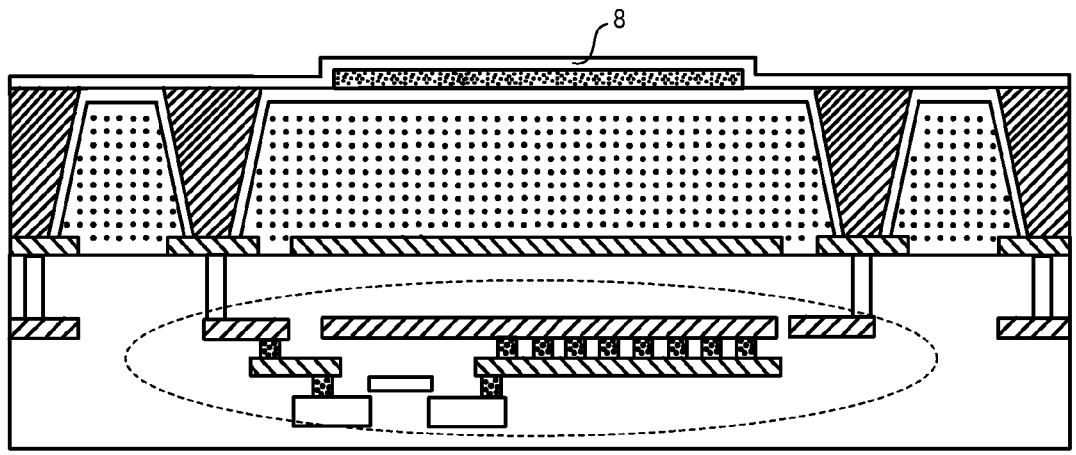
FIG. 32 is a cross sectional view observed in a step of an example manufacturing method of the first thermosensitive element and the second thermosensitive element according to the third example of the present invention.
Figure 33:
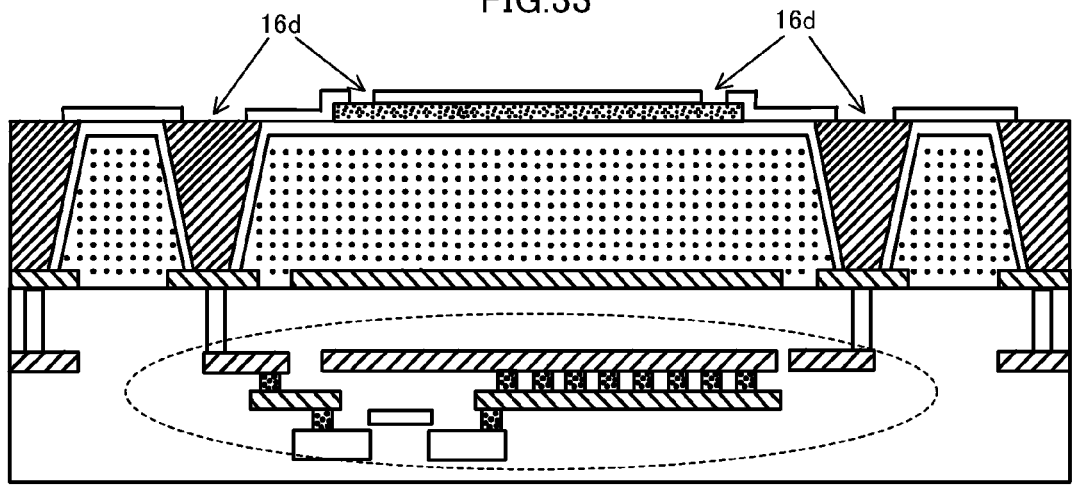
FIG. 33 is a cross sectional view observed in a step of an example manufacturing method of the first thermosensitive element and the second thermosensitive element according to the third example of the present invention.

Next, a silicon oxide film (SiO, $SiO_2$), a silicon nitride film (SiN, $Si_3N_4$), a silicon oxynitride film (SiON), or the like is deposited by plasma CVD method or the like such that the film has a thickness of about 10 to 200 nm, thereby the second protection film 8 for protecting the bolometer thin film 7 is formed as shown in FIG. 32. Then, the second protection film 8 at end portions of the bolometer thin film 7 on the first sacrifice layer 5 and the second protection film 8 on the embedded layer 20 are removed to form contact holes 16d as shown in FIG. 33.

Figure 34:
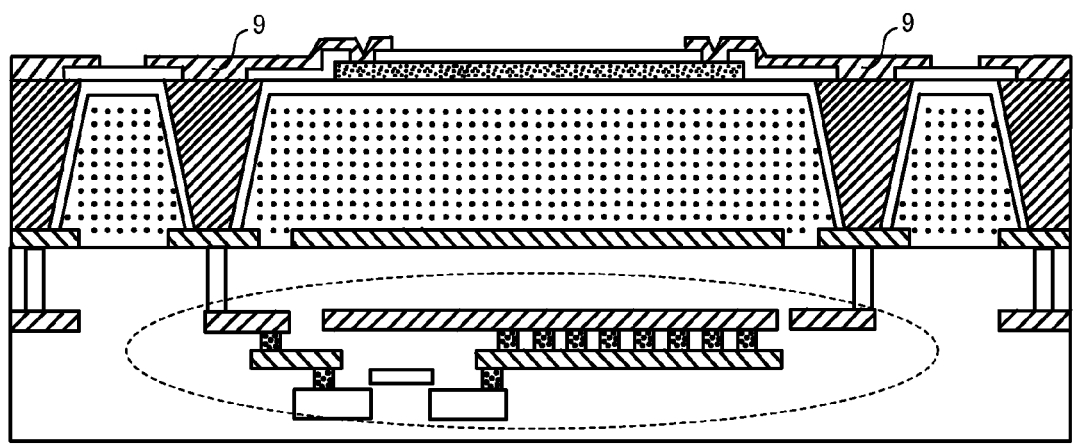
FIG. 34 is a cross sectional view observed in a step of an example manufacturing method of the first thermosensitive element and the second thermosensitive element according to the third example of the present invention.

Next, a metal such as Al, Cu, Au, Ti, W, Mo, etc. is deposited by sputtering method or the like such that the deposited metal has a film thickness of about 10 to 200 nm, and then the film is patterned with a resist mask, thereby the electrode wire 9 is formed as shown in FIG. 34. The electrode wire 9 is connected to the bolometer thin film 7 via the contact holes 16d and also to the reading circuit 2a in the silicon substrate 2 via the contact hole 16d and the embedded layer 20. According to the present example, the opening in the support member 13 of the first thermosensitive element 1a and the second thermosensitive element 1b is flattened with the embedded layer 20. Accordingly, the electrode wire 9 is not formed slim in the thickness and will not suffer problems such as that the resistance of the electrode wire 9 increases.

Figure 35:
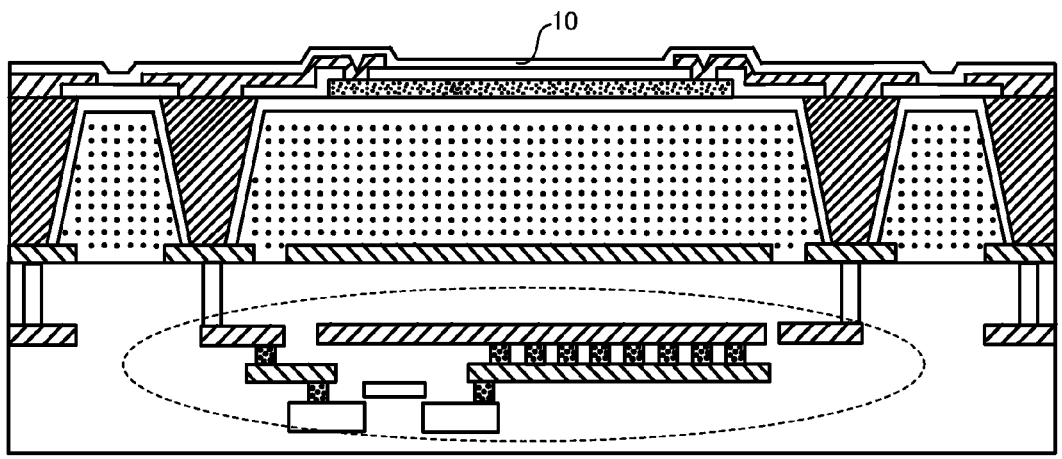
FIG. 35 is a cross sectional view observed in a step of an example manufacturing method of the first thermosensitive element and the second thermosensitive element according to the third example of the present invention.

Next, a silicon oxide film (SiO, $SiO_2$), a silicon nitride film (SiN, $Si_3N_4$), a silicon oxynitride film (SiON), or the like is deposited by plasma CVD method or the like such that the film has a thickness of about 50 to 500 nm, thereby the third protection film 10 for protecting the electrode wire 9 is formed as shown in FIG. 35.

Then, likewise the first example, the first protection film 6, the second protection film 8, and the third protection film 10 are partially etched such that first slits 17 are formed in each first thermosensitive element 1a and a second slit 18 is formed in the region between adjoining first thermosensitive elements 1a, thereby the first sacrifice layer 5 is partially exposed. Then, heating or plasma treatment is performed in an oxygen atmosphere to remove the first sacrifice layer 5 through the first slits 17 and the second slits 18. When the first sacrifice layer 5 is removed, the support member 13 is a column and holds up the temperature detecting unit 14. The column has an opening inside the outer wall made with the first protection film 6 and the opening is embedded with metal (an embedded layer 20).

At this time, since no first slit 17 or second slit 18 is formed in each second thermosensitive element 1b and in the region between adjoining second thermosensitive elements 1b, the first sacrifice layer 5 remains beneath each second thermosensitive element 1b and in the region between adjoining second thermosensitive elements 1b.

Through the above steps, an infrared sensor is completed including the first thermosensitive elements 1a having a micro-bridge structure embodied by the temperature detecting unit 14 held up above the silicon substrate 2 by means of the support member 13 as shown in FIG. 28A, and the second thermosensitive elements 1b having the temperature detecting unit 14 formed on the first sacrifice layer 5 made of DLC as shown in FIG. 28B.

In the present example, an appentice 12 may be formed over the first thermosensitive element 1a as in the first example. In such a case, first slits 17 are formed in each first thermosensitive element 1a and a second slit 18 is formed in the region between adjoining first thermosensitive elements 1a in order that the first sacrifice layer 5 is partially exposed. Then, a second sacrifice layer 11 is formed on the regions other than the neighborhood of the contact holes 16d formed at the end portions of the bolometer thin film 7. Then, an appentice 12 is formed over the first thermosensitive element 1a, and the appentice 12 over the first thermosensitive element 1a is partially etched such that the top of the temperature detecting unit 14 of the first thermosensitive element 1a is exposed and such that the second sacrifice layer 11 is partially exposed through a third slit 19 that is etched open in the region between adjoining first thermosensitive elements 1a. Then, heating or plasma treatment is performed in an oxygen atmosphere to remove the second sacrifice layer 11 over the first thermosensitive element 1a and over the region between adjoining first thermosensitive elements 1a, and to remove the second sacrifice layer 11 over the second thermosensitive element 1b. Then, the first sacrifice layer 5 is removed through the first slits 17 and the second slits 18. At this time, since no first slit 17 or second slit 18 is formed in the second thermosensitive element 1b, the first sacrifice layer 5 remains beneath the second thermosensitive element 1b and in the region between adjoining second thermosensitive elements 1b.

The second thermosensitive element 1b may keep the second sacrifice layer 11 and the appentice 12 remaining thereon. In such a case, first slits 17 are formed in each first thermosensitive element 1a (and in each second thermosensitive element 1b, if necessary), and a second slit 18 is formed in the region between adjoining first thermosensitive elements 1a (and in the region between adjoining second thermosensitive elements 1b, if necessary), in order that the first sacrifice layer 5 is partially exposed. Then, a second sacrifice layer 11 is formed on the regions other than the neighborhood of the contact holes 16d formed at the end portions of the bolometer thin film 7. Then, an appentice 12 is formed over the first thermosensitive element 1a and over the second thermosensitive element 1b, and the appentice 12 over the first thermosensitive element 1a is partially etched such that the top of the temperature detecting unit 14 of the first thermosensitive element 1a is exposed and such that the second sacrifice layer 11 is partially exposed through a third slit 19 that is etched open in the region between adjoining first thermosensitive elements 1a. Then, heating or plasma treatment is performed in an oxygen atmosphere to remove the second sacrifice layer 11 over the first thermosensitive element 1a and to remove the second sacrifice layer 11 over the region between adjoining first thermosensitive elements 1a through the third slit 19. Then, the first sacrifice layer 5 beneath the first thermosensitive element 1a is removed through the first slits 17 and the second slits 18. At this time, since the appentice 12 is kept remaining over the second thermosensitive element 1b, the first sacrifice layer 5 remains beneath the second thermosensitive element 1b and in the region between adjoining second thermosensitive elements 1b.

The third example has shown a case of embedding the opening inside the support member 13 with a metal, which is applied to the manufacturing method according to the first example. Embedding the opening inside the support member 13 with a metal may also be applied to the manufacturing method according to the second example.

Each of the above examples has shown a case of an infrared sensor including a first thermosensitive element 1a and a second thermosensitive element 1b, where a clearance is provided between the temperature detecting unit 14 of the first thermosensitive element 1a and the silicon substrate 2 to thermally insulate the temperature detecting unit 14 of the first thermosensitive element 1a from the silicon substrate 2. However, the manufacturing method of each of the above examples may be applied to an infrared sensor that includes only a thermosensitive element for sensing an infrared ray (i.e., including no second thermosensitive element 1b).

Each of the above examples has shown an example where a second thermosensitive element 1b has an adjoining second thermosensitive element 1b therearound. When forming a second thermosensitive element 1b that has no adjoining second thermosensitive element 1b, a region on which no first sacrifice layer 5 is to be formed may be formed next to the region on which this second thermosensitive element 1b is to be formed, and the first protection film 6, while it is formed, may cover the sides of the first sacrifice layer 5 on the region on which this second thermosensitive element 1b is to be formed. This can prevent the first sacrifice layer 5 on the region on which the second thermosensitive element 1b is formed from being removed when the first sacrifice layer 5 is removed from the first thermosensitive element 1a by dry etching.

The above exemplary embodiment is one example of the structure of the infrared sensor array and each infrared sensor included therein according to the present invention. Each of the above examples is one example manufacturing method of the infrared sensor according to the present invention, and there are no particular limitations about the film thickness, shape, manufacturing conditions, etc. of each structural member. The present invention is not limited to an infrared sensor. It can as well be applied to a sensor having a like structure for sensing light having a wavelength other than that of an infrared ray, or an electromagnetic wave (e.g., a THz wave).

The present invention can be applied not only to an infrared sensor array but also to an infrared sensor that uses only one pair of a first thermosensitive element 1a and a second thermosensitive element 1b.

As explained above, according to the present invention, a structure, which includes: a first thermosensitive element 1a whose temperature detecting unit 14 is thermally insulated from a silicon substrate 2 by a clearance 15; and a second thermosensitive element 1b whose temperature detecting unit 14 is disposed on a first sacrifice layer 5 to be thermally connected to the silicon substrate 2, can make the temperature detecting unit 14 of the second thermosensitive element 1b quickly follow the temperature of the silicon substrate 2 and can prevent occurrence of any problem in removing the first sacrifice layer 5 from the first thermosensitive element 1a to form the clearance 15.

This is because the material used as the sacrifice layer is diamond like carbon (amorphous carbon), which has a higher heat transfer rate than that of polyimide resin and the like, and which is more process-compatible than silicon, polysilicon, metal, and the like.

An exemplary embodiment of the present invention has been explained. It should be understood that various modifications or combinations that may be called for from design needs or other factors are included in the scope of the invention set forth in the claims and of the invention described in the description in a manner to correspond to any specific example.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. An infrared sensor, comprising:
    a first element including a temperature detecting unit that outputs a signal corresponding to a temperature to which the temperature detecting unit has risen from an ambient temperature in response to an infrared ray that has entered the temperature detecting unit, the first element being formed above a substrate;
    a second element including a temperature detecting unit that outputs a signal corresponding to the ambient temperature, the second element being formed on the substrate; and
    a signal correcting unit that corrects the signal output by the temperature detecting unit of the first element based on the signal output by the temperature detecting unit of the second element,
    wherein:
    the temperature detecting unit of the first element and the substrate are disposed to have a clearance therebetween,
    a sacrifice layer that is made of diamond like carbon is formed between the temperature detecting unit of the second element and the substrate,
    the first element includes a support member that holds up the temperature detecting unit,
    the second element includes a support member that has a same structure as that of the support member of the first element, the support member being embedded in the sacrifice layer,
    the support member of each of the first element and the second element has a columnar shape and has an opening extending thereinside from the temperature detecting unit to the substrate, the opening being embedded with a metal,
    a signal output by the temperature detecting unit of the first element is transferred to the signal correcting unit via the metal that is embedded in the opening in the support member of the first element, and
    a signal output by the temperature detecting unit of the second element is transferred to the signal correcting unit via the metal that is embedded in the opening in the support member of the second element.

2. The infrared sensor according to claim 1, wherein the clearance is formed in a manner that a sacrifice layer made of diamond like carbon is formed on the substrate, the temperature detecting unit is formed on the sacrifice layer, and the sacrifice layer is removed.

3. The infrared sensor according to claim 1,
    wherein the temperature detecting unit of the first element has a sheet-like shape, and includes a thin-film-like thermosensitive resistor whose resistance value changes in response to a temperature change corresponding to heat produced by an infrared ray that enters the thermosensitive resistor, and
    the infrared sensor comprises an appentice that is coupled to the temperature detecting unit of the first element, the appentice being positioned over the first element such that the appentice covers regions of the first element other than a region occupied by the thermosensitive resistor included in the temperature detecting unit of the first element, the appentice transferring heat produced by an infrared ray that enters the appentice to the temperature detecting unit.

4. The infrared sensor according to claim 1,
    wherein the temperature detecting unit of each of the first element and the second element includes:
    a first protection film;
    a thermosensitive resistor formed on the first protection film;
    a second protection film that covers the thermosensitive resistor;
    a wire that is formed on the second protection film and connected to the thermosensitive resistor via a contact hole formed in the second protection film; and
    a third protection film that covers the wire and the thermosensitive resistor,
    a signal output by the thermosensitive resistor included in the temperature detecting unit of the first element is transferred to the signal correcting unit through the wire included in the temperature detecting unit of the first element, and
    a signal output by the thermosensitive resistor included in the temperature detecting unit of the second element is transferred to the signal correcting unit through the wire included in the temperature detecting unit of the second element.

5. The infrared sensor according to claim 1,
    wherein the temperature detecting unit of each of the first element and the second element includes:
    a first protection film;
    a wire formed on the first protection film;
    a second protection film that covers the wire;

a thermosensitive resistor that is formed on the second protection film and connected to the wire via a contact hole formed in the second protection film; and a third protection film that covers the thermosensitive resistor, a signal output by the thermosensitive resistor included in the temperature detecting unit of the first element is transferred to the signal correcting unit through the wire included in the temperature detecting unit of the first element, and a signal output by the thermosensitive resistor included in the temperature detecting unit of the second element is transferred to the signal correcting unit through the wire included in the temperature detecting unit of the second element.

6. A manufacturing method of an infrared sensor including: a first element that outputs a signal corresponding to a temperature to which the first element has risen from an ambient temperature in response to an infrared ray that has entered the first element; and a second element that outputs a signal corresponding to the ambient temperature, the method comprising:

- a step of forming a sacrifice layer made of diamond like carbon on a region of a substrate above which the first element is intended to be formed and on a region of the substrate on which the second element is intended to be formed;
- a step of forming a first protection film that covers the sacrifice layer;
- a step of forming, on the first protection film that covers the sacrifice layer, a thin-film-like thermosensitive resistor whose resistance value changes in response to a temperature change corresponding to heat produced by an infrared ray that enters the thermosensitive resistor;
- a step of forming a third protection film that covers the thermosensitive resistor;
- a step of forming a slit that penetrates through the first protection film and the third protection film that are formed on the region above which the first element is intended to be formed, and removing through the slit, the sacrifice layer formed on the region above which the first element is intended to be formed; and before the step of forming the sacrifice layer:
- a step of forming a signal correcting unit in the substrate, the signal correcting unit correcting the signal output by the first element based on the signal output by the second element; and
- a step of forming a contact on each region of the substrate above which the first element is intended to be formed and the region of the substrate on which the second element is intended to be formed, the contact being connected to the signal correcting unit, wherein:

at the step of forming the sacrifice layer, the sacrifice layer is formed such that an opening, in which diamond like carbon is absent, is formed above the contact, at the step of forming the first protection film, a support member that has a columnar shape and is constituted by the first protection film and a metal to be embedded in the opening is formed in a manner that the first protection film is formed on the sacrifice layer and also inside the opening, the first protection film formed on the contact is removed, the metal is embedded in the opening, and the metal on the sacrifice layer is removed by polishing, and at the step of forming the thermosensitive resistor, a wire is formed, the wire connecting an end portion of the formed thermosensitive resistor to the metal embedded in the opening above the contact.

* * * * *